(12) United States Patent
Pietsch et al.

(10) Patent No.: US 9,071,358 B2
(45) Date of Patent: Jun. 30, 2015

(54) REPEATER FIBER-COAX UNITS

(71) Applicant: QUALCOMM Incorporated, San Diego, CA (US)

(72) Inventors: Christian Pietsch, Nuremberg (DE); Nicola Varanese, Nuremberg (DE); Juan Montojo, Nuremberg (DE); Andrea Maria Garavaglia, Nuremberg (DE)

(73) Assignee: QUALCOMM Incrorporated, San Diego, CA (US)

( * ) Notice: Subject to any disclaimer, the term of this patent is extended or adjusted under 35 U.S.C. 154(b) by 22 days.

(21) Appl. No.: 13/794,450

(22) Filed: Mar. 11, 2013

(65) Prior Publication Data
US 2013/0343759 A1 Dec. 26, 2013

Related U.S. Application Data

(60) Provisional application No. 61/662,884, filed on Jun. 21, 2012, provisional application No. 61/662,888, filed on Jun. 21, 2012, provisional application No. 61/702,195, filed on Sep. 17, 2012.

(51) Int. Cl.
| | | |
|---|---|---|
| H04J 14/08 | (2006.01) | |
| G06F 15/16 | (2006.01) | |
| H04L 12/28 | (2006.01) | |
| H04B 10/27 | (2013.01) | |
| H04J 3/16 | (2006.01) | |
| H04Q 11/00 | (2006.01) | |
| H04L 12/64 | (2006.01) | |

(52) U.S. Cl.
CPC ............ *H04B 10/271* (2013.01); *H04J 3/1694* (2013.01); *H04Q 11/0067* (2013.01); *H04Q 2011/0064* (2013.01); *H04L 12/6418* (2013.01)

(58) Field of Classification Search
USPC ........................................ 398/75, 115, 41, 67
See application file for complete search history.

(56) References Cited

U.S. PATENT DOCUMENTS

| | | | |
|---|---|---|---|
| 5,638,371 A | 6/1997 | Raychaudhuri et al. | |
| 6,154,464 A | 11/2000 | Feuerstraeter et al. | |
| 7,301,970 B2 | 11/2007 | Kim et al. | |
| 7,548,549 B2 * | 6/2009 | Bergeron et al. ............. | 370/419 |
| 7,602,917 B2 | 10/2009 | Vialen et al. | |

(Continued)

FOREIGN PATENT DOCUMENTS

EP 2509259 A1 10/2012

OTHER PUBLICATIONS

Huang J., et al., "Design and Implementation of the Broadband Network Acess System over MoCA", SPIE, PO Box 18 Bellingham WA 98227-0010 USA, 2009, XP040504751, the whole document.

(Continued)

*Primary Examiner* — Oommen Jacob
(74) *Attorney, Agent, or Firm* — Mahamedi Paradice LLP

(57) ABSTRACT

An optical-coax unit (OCU) includes an optical PHY to receive and transmit optical signals and a coax PHY to receive and transmit coax signals. The OCU also includes a media-independent interface to provide a first continuous bitstream from the optical PHY to the coax PHY and a second continuous bitstream from the coax PHY to the optical PHY. The first continuous bitstream corresponds to received optical signals and transmitted coax signals, and the second continuous bitstream corresponds to received coax signals and transmitted optical signals.

16 Claims, 16 Drawing Sheets

(56) References Cited

U.S. PATENT DOCUMENTS

| | | | |
|---|---|---|---|
| 8,023,885 B2 | 9/2011 | Proctor, Jr. et al. | |
| 8,081,625 B2 | 12/2011 | Powell et al. | |
| 8,094,653 B2 | 1/2012 | Hepler et al. | |
| 8,098,691 B2* | 1/2012 | Powell et al. | 370/503 |
| 8,149,861 B2 | 4/2012 | Yu et al. | |
| 8,848,523 B2* | 9/2014 | Boyd et al. | 370/230 |
| 2007/0147837 A1 | 6/2007 | Yoo et al. | |
| 2007/0268846 A1 | 11/2007 | Proctor, Jr. et al. | |
| 2008/0049788 A1* | 2/2008 | McClellan | 370/468 |
| 2008/0050443 A1 | 2/2008 | Kowalski et al. | |
| 2008/0080443 A1 | 4/2008 | Martinot et al. | |
| 2008/0279125 A1* | 11/2008 | Hottinen | 370/281 |
| 2009/0061887 A1 | 3/2009 | Hart et al. | |
| 2009/0080346 A1* | 3/2009 | Powell et al. | 370/257 |
| 2009/0092154 A1 | 4/2009 | Malik et al. | |
| 2009/0327506 A1* | 12/2009 | Diab | 709/230 |
| 2010/0111524 A1 | 5/2010 | Yu | |
| 2010/0257391 A1 | 10/2010 | Dring et al. | |
| 2010/0322105 A1* | 12/2010 | Diab | 370/254 |
| 2011/0058813 A1 | 3/2011 | Boyd et al. | |
| 2011/0261719 A1* | 10/2011 | Welin | 370/252 |
| 2012/0257891 A1* | 10/2012 | Boyd et al. | 398/45 |
| 2012/0257892 A1 | 10/2012 | Boyd et al. | |
| 2012/0257893 A1* | 10/2012 | Boyd et al. | 398/58 |
| 2012/0307637 A1* | 12/2012 | Diab | 370/235 |
| 2013/0272177 A1* | 10/2013 | Wei et al. | 370/294 |
| 2013/0315595 A1* | 11/2013 | Barr | 398/67 |
| 2013/0343753 A1* | 12/2013 | Pietsch et al. | 398/41 |
| 2013/0343759 A1* | 12/2013 | Pietsch et al. | 398/75 |
| 2014/0003308 A1 | 1/2014 | Varanese et al. | |
| 2014/0010539 A1 | 1/2014 | Varanese et al. | |

OTHER PUBLICATIONS

International Search Report and Written Opinion—PCT/US2013/044693—ISA/EPO—Oct. 10, 2013.

Varanese N., et al., "EPoC Architecture Considerations", Internet Citation, May 15, 2012, pp. 1-13, XP002713589, Retrieved from the Internet: URL: http://grouper.ieee.org/groups/802/3/epoc/public/may12/varanese_01a_0512.pdf [retrieved on Sep. 24, 2013] the whole document.

Chan, C.A., "Improving Performance of Optical Access Networks", National Information and Communication Technology Australia (NICTA), Jan. 2010, pp. 1-202.

Salinger et al., "Feasibility of TDD in EPoC," IEEE 802 Plenary San Diego, CA Jul. 16-20, 2012, pp. 1-57.

Shellhammer et. al., "Technical Viability of EPOC Time Division Duplex (TDD) Mode," IEEE 802.3 Interim Session Minneapolis, MN May 15-16, 2012, pp. 1-19.

* cited by examiner

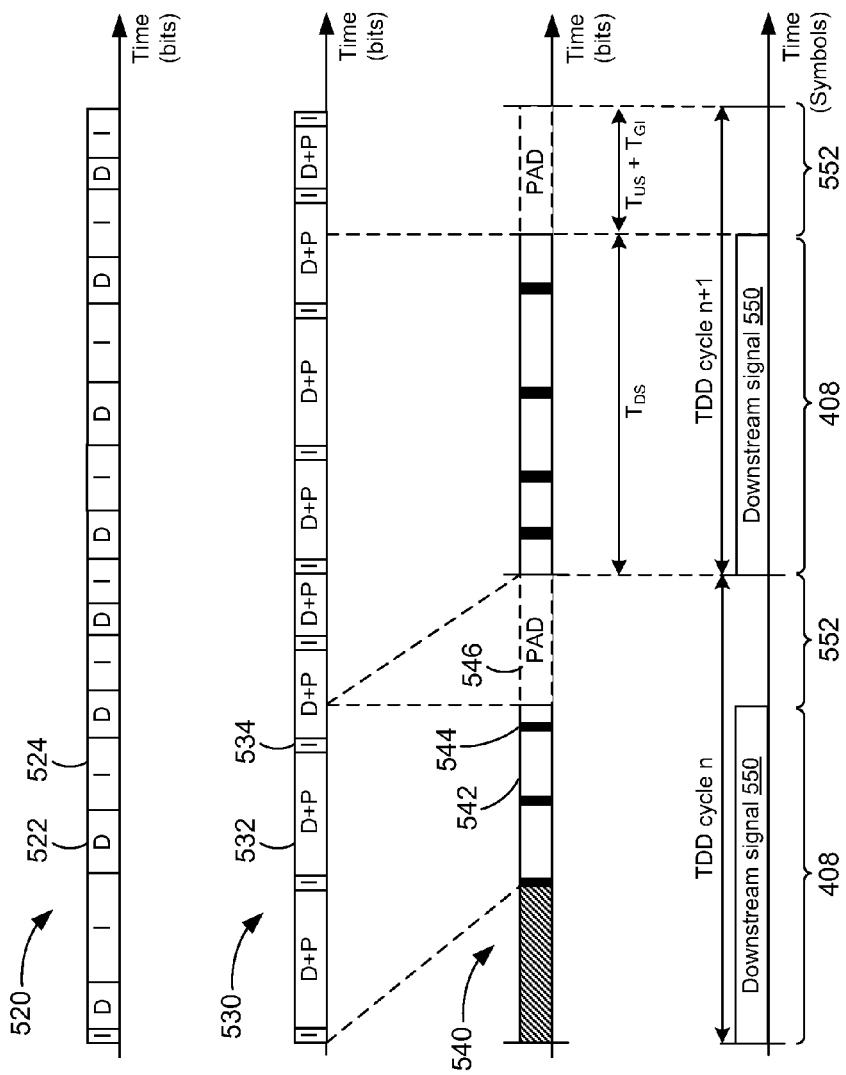
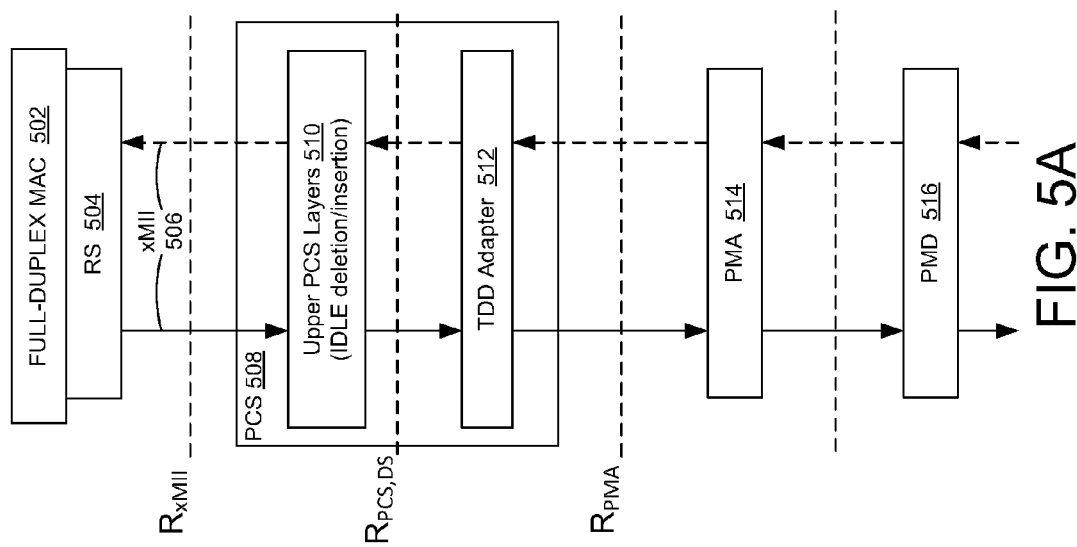
FIG. 5B
FIG. 5A

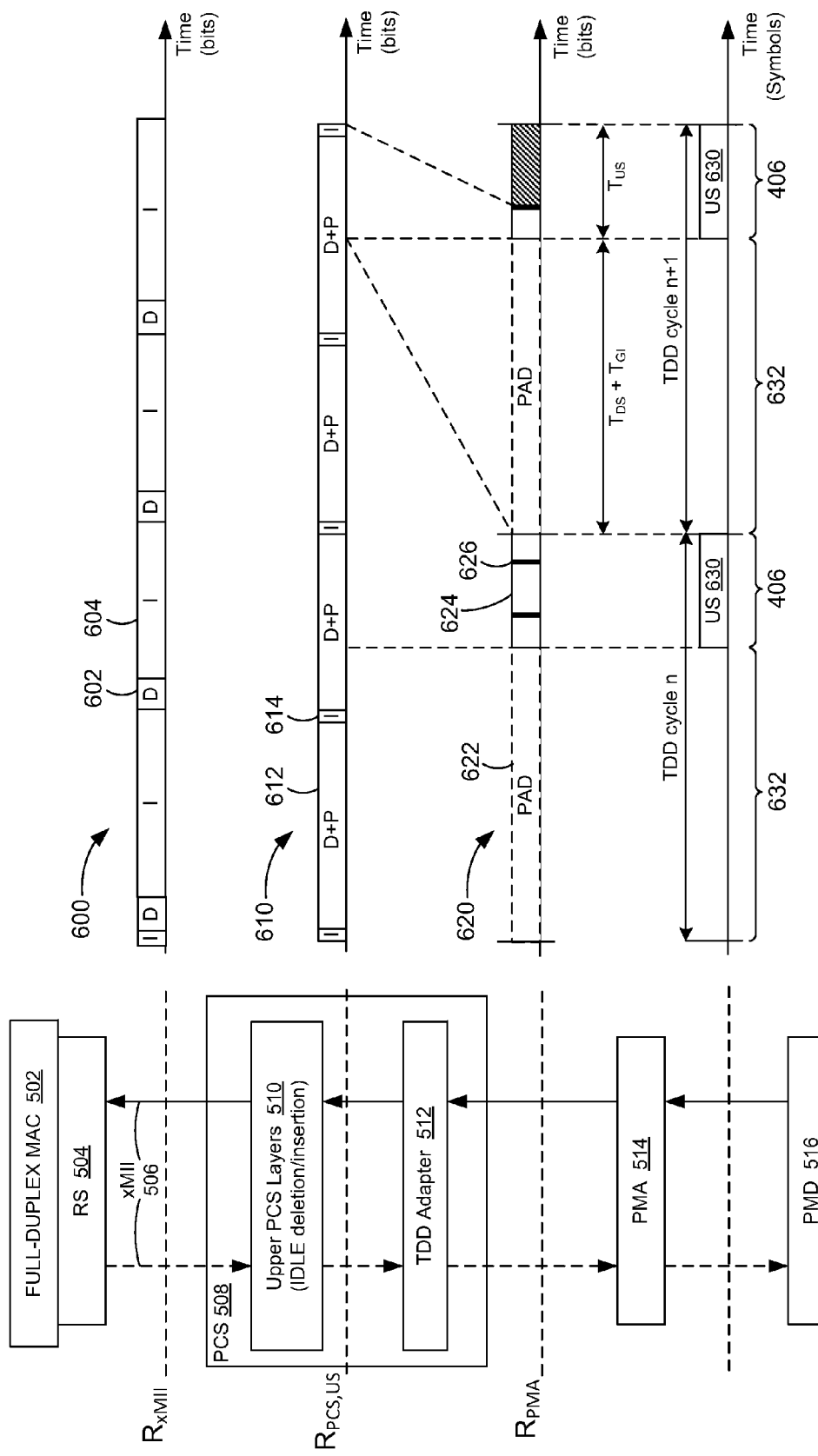

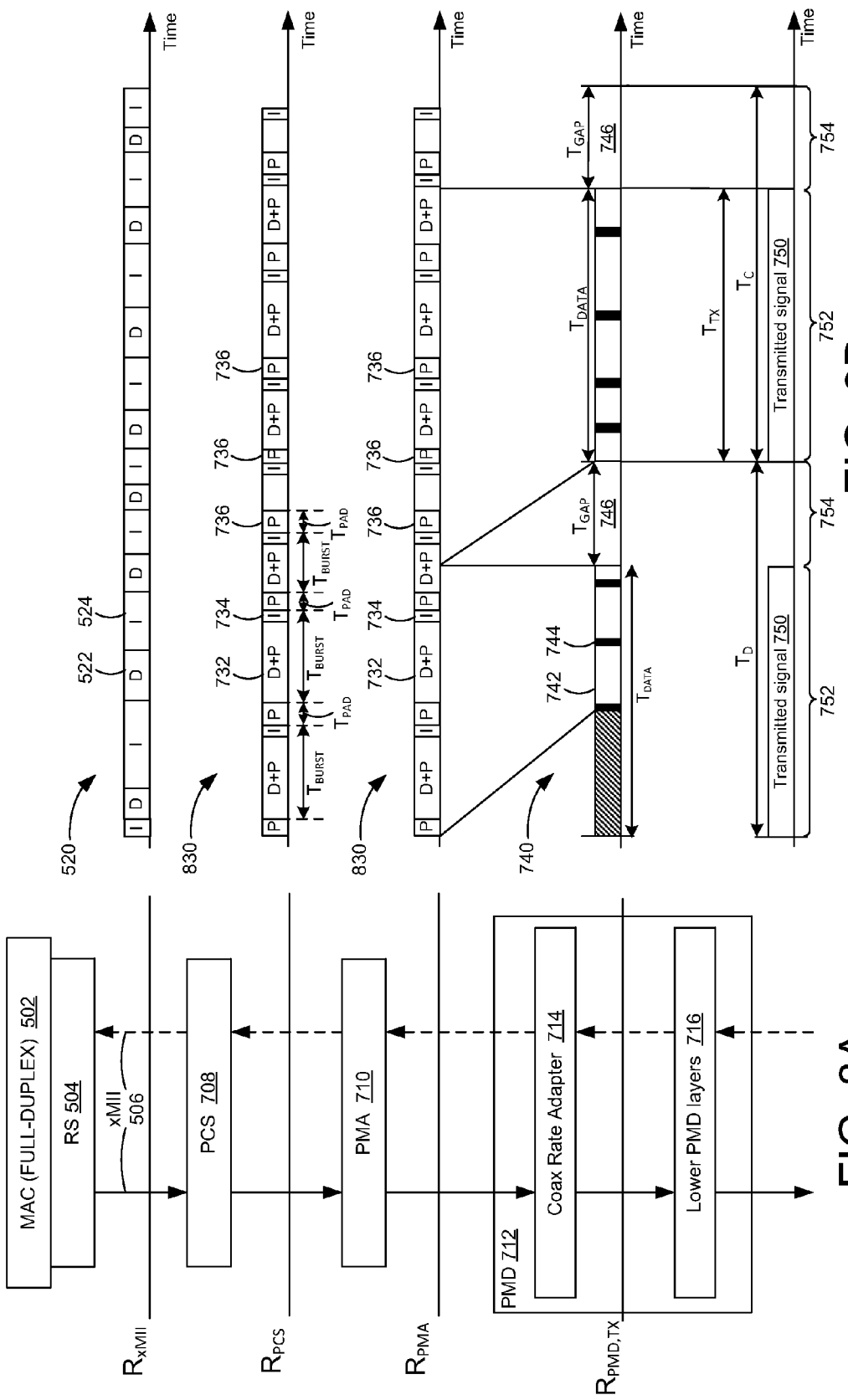

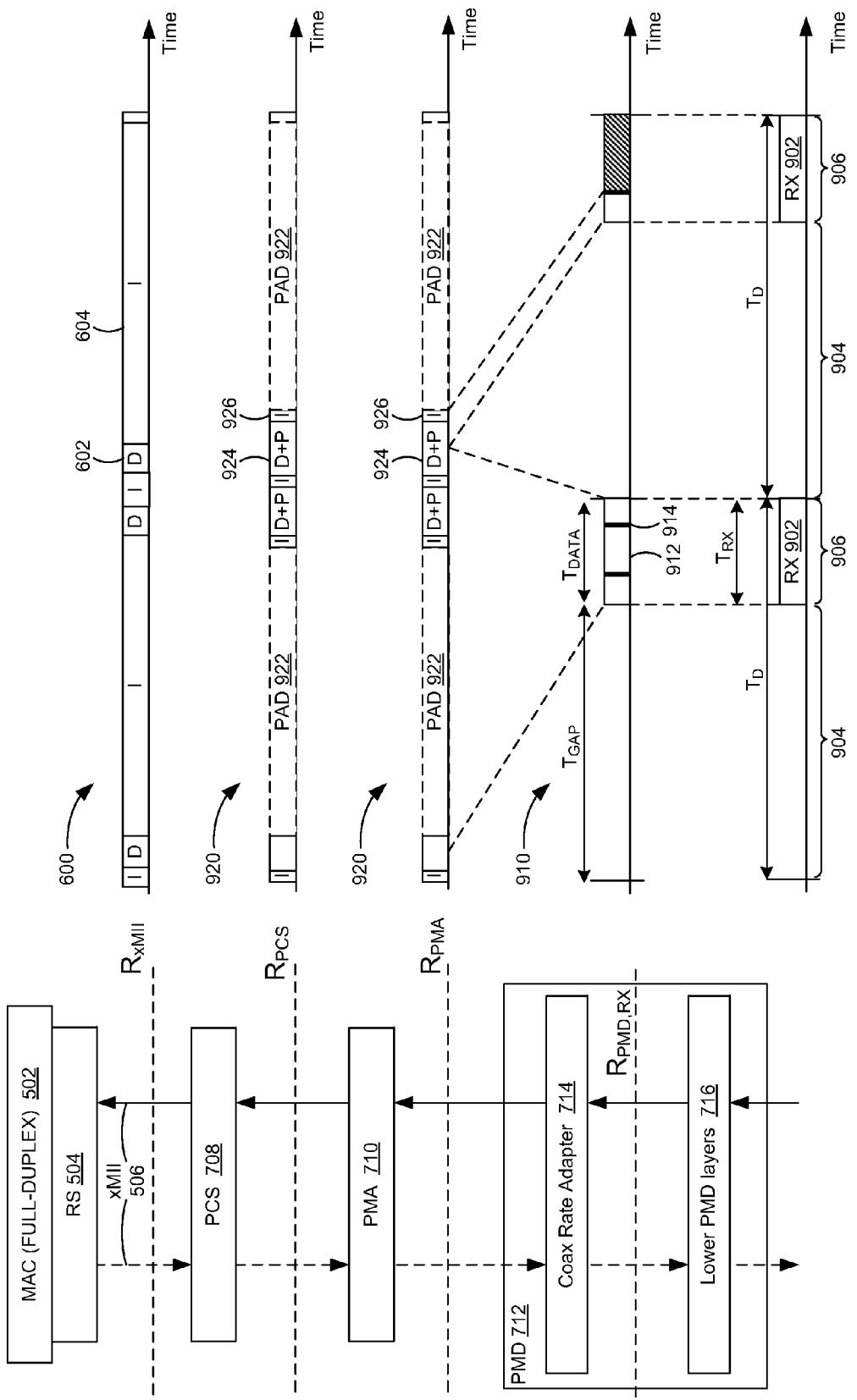

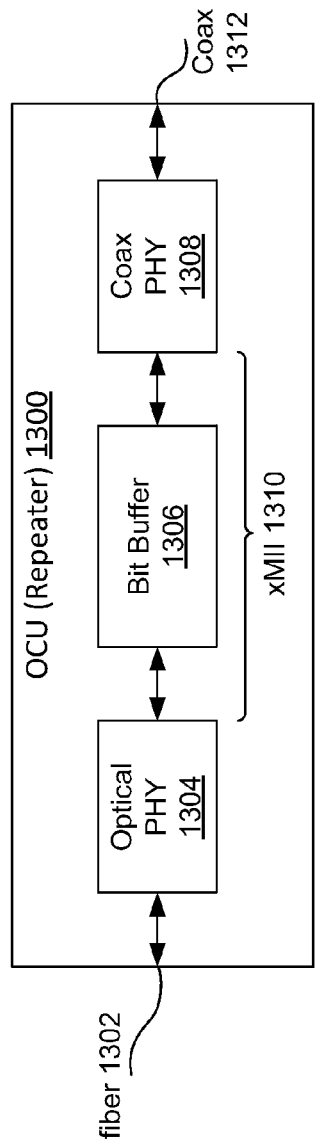
FIG. 13A
FIG. 13B
FIG. 13C

REPEATER FIBER-COAX UNITS

RELATED APPLICATIONS

This application claims priority to U.S. Provisional Patent Applications No. 61/662,884, titled "Methods and Systems for Implementing Time-Division Duplexing in the Physical Layer," filed Jun. 21, 2012; No. 61/662,888, titled "Optical-Coax Unit Implementing Time-Division Duplexing in the Physical Layer," filed Jun. 21, 2012; and No. 61/702,195, titled "Rate Adaptation for Implementing Time-Division Duplexing and Frequency-Division Duplexing in the Physical Layer," filed Sep. 17, 2012, all of which are hereby incorporated by reference in their entirety.

TECHNICAL FIELD

The present embodiments relate generally to communication systems, and specifically to communication systems that include both optical and coaxial portions.

BACKGROUND OF RELATED ART

The Ethernet Passive Optical Networks (EPON) protocol may be extended over coaxial (coax) links in a cable plant. The EPON protocol as implemented over coax links is called EPoC. Implementing an EPoC network or similar network over a coax cable plant presents significant challenges. For example, EPON-compatible systems traditionally achieve full-duplex communications using frequency-division duplexing (FDD). However, cable operators may desire to use time-division duplexing (TDD) instead of FDD for communications between a coax line terminal and coax network units.

BRIEF DESCRIPTION OF THE DRAWINGS

The present embodiments are illustrated by way of example and are not intended to be limited by the figures of the accompanying drawings.

FIG. 5A is a block diagram of sublayers in a TDD PHY coupled to a full-duplex MAC in accordance with some embodiments.

FIG. 5B shows downstream signals provided between the various sublayers of FIG. 5A in accordance with some embodiments.

FIG. 6A is a block diagram of sublayers in a TDD PHY coupled to a full-duplex MAC in accordance with some embodiments.

FIG. 6B shows upstream signals provided between the various sublayers of FIG. 6A in accordance with some embodiments.

FIG. 8A is a block diagram of sublayers in a TDD PHY coupled to a full-duplex MAC in accordance with some embodiments.

FIG. 8B shows signals provided between the various sublayers of FIG. 8A when transmitting in accordance with some embodiments.

FIG. 9A is a block diagram of sublayers in a TDD PHY coupled to a full-duplex MAC in accordance with some embodiments.

FIG. 9B shows signals provided between the various sublayers of FIG. 9A when receiving in accordance with some embodiments.

FIG. 13A is a block diagram of an optical-coax unit implemented as a repeater in accordance with some embodiments.

FIG. 13B illustrates a bitstream in an optical PHY of the optical-coax unit of FIG. 13A in accordance with some embodiments.

FIG. 13C illustrates OFDM symbols transmitted by a coax PHY of the optical-coax unit of FIG. 13A in accordance with some embodiments.

Like reference numerals refer to corresponding parts throughout the drawings and specification.

DETAILED DESCRIPTION

Embodiments are disclosed in which an optical-coax unit (OCU) is implemented as a repeater. An optical physical-layer device (PHY) in the OCU may be coupled to a coax PHY in the OCU without an intervening media-access controller (MAC).

In some embodiments, an OCU includes an optical PHY to receive and transmit optical signals and a coax PHY to receive and transmit coax signals. The OCU also includes a media-independent interface to provide a first continuous bitstream from the optical PHY to the coax PHY and a second continuous bitstream from the coax PHY to the optical PHY. The first continuous bitstream corresponds to received optical signals and transmitted coax signals, and the second continuous bitstream corresponds to received coax signals and transmitted optical signals.

In some embodiments, a method of data communications is performed in an OCU. In the method, optical signals are received and transmitted in an optical PHY. Coax signals are received and transmitted in a coax PHY. A first continuous bitstream, which corresponds to received optical signals and transmitted coax signals, is provided from the optical PHY to the coax PHY over a media-independent interface. A second continuous bitstream, which corresponds to received coax signals and transmitted optical signals, is provided from the coax PHY to the optical PHY over the media-independent interface.

In the following description, numerous specific details are set forth such as examples of specific components, circuits, and processes to provide a thorough understanding of the present disclosure. Also, in the following description and for purposes of explanation, specific nomenclature is set forth to provide a thorough understanding of the present embodiments. However, it will be apparent to one skilled in the art that these specific details may not be required to practice the present embodiments. In other instances, well-known circuits and devices are shown in block diagram form to avoid obscuring the present disclosure. The term "coupled" as used herein means connected directly to or connected through one or more intervening components or circuits. The present embodiments are not to be construed as limited to specific examples described herein but rather to include within their scope all embodiments defined by the appended claims.

Figure 1A:
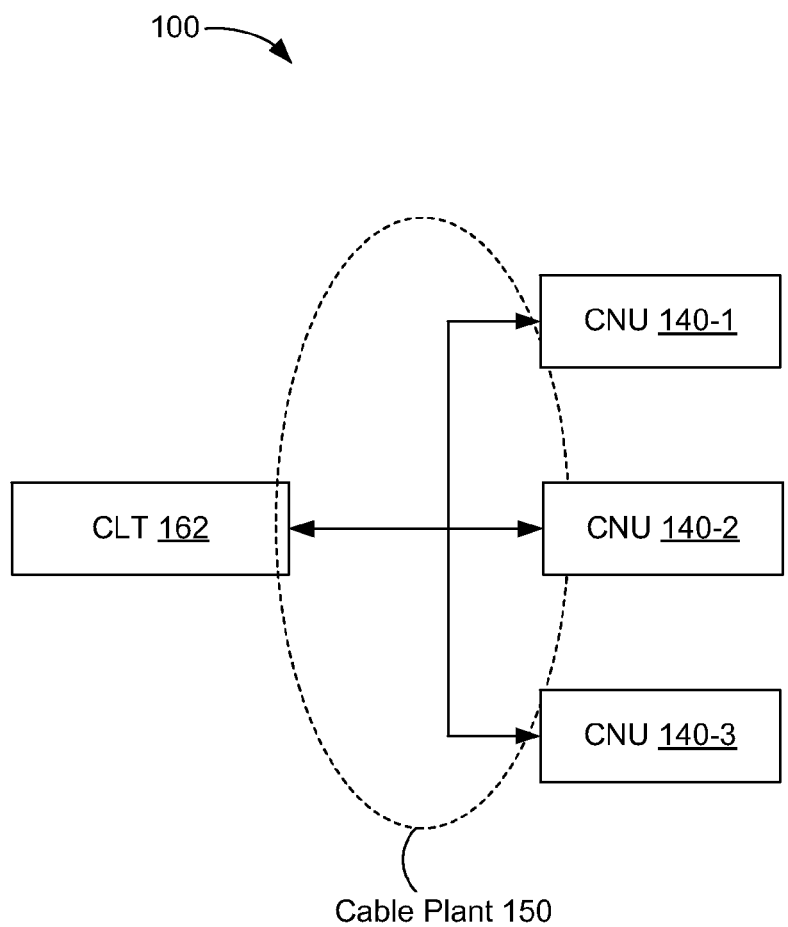
FIG. 1A is a block diagram of a coaxial network in accordance with some embodiments.

FIG. 1A is a block diagram of a coax network 100 (e.g., an EPoC network) in accordance with some embodiments. The network 100 includes a coax line terminal (CLT) 162 (also referred to as a coax link terminal) coupled to a plurality of coax network units (CNUs) 140-1, 140-2, and 140-3 via coax links. A respective coax link may be a passive coax cable, or may also include one or more amplifiers and/or equalizers. The coax links compose a cable plant 150. In some embodiments, the CLT 162 is located at the headend of the cable plant 150 and the CNUs 140-1, 140-2, and 140-3 are located at the premises of respective users.

The CLT 162 transmits downstream signals to the CNUs 140-1, 140-2, and 140-3 and receives upstream signals from the CNUs 140-1, 140-2, and 140-3. In some embodiments, each of the CNUs 140-1, 140-2, and 140-3 receives every packet transmitted by the CLT 110 and discards packets that are not addressed to it. The CNUs 140-1, 140-2, and 140-3 transmit upstream signals at scheduled times specified by the CLT 162. For example, the CLT 162 transmits control messages (e.g., GATE messages) to the CNUs 140-1, 140-2, and 140-3 specifying respective future times at which respective CNUs 140-1, 140-2, and 140-3 may transmit upstream signals.

Figure 1B:
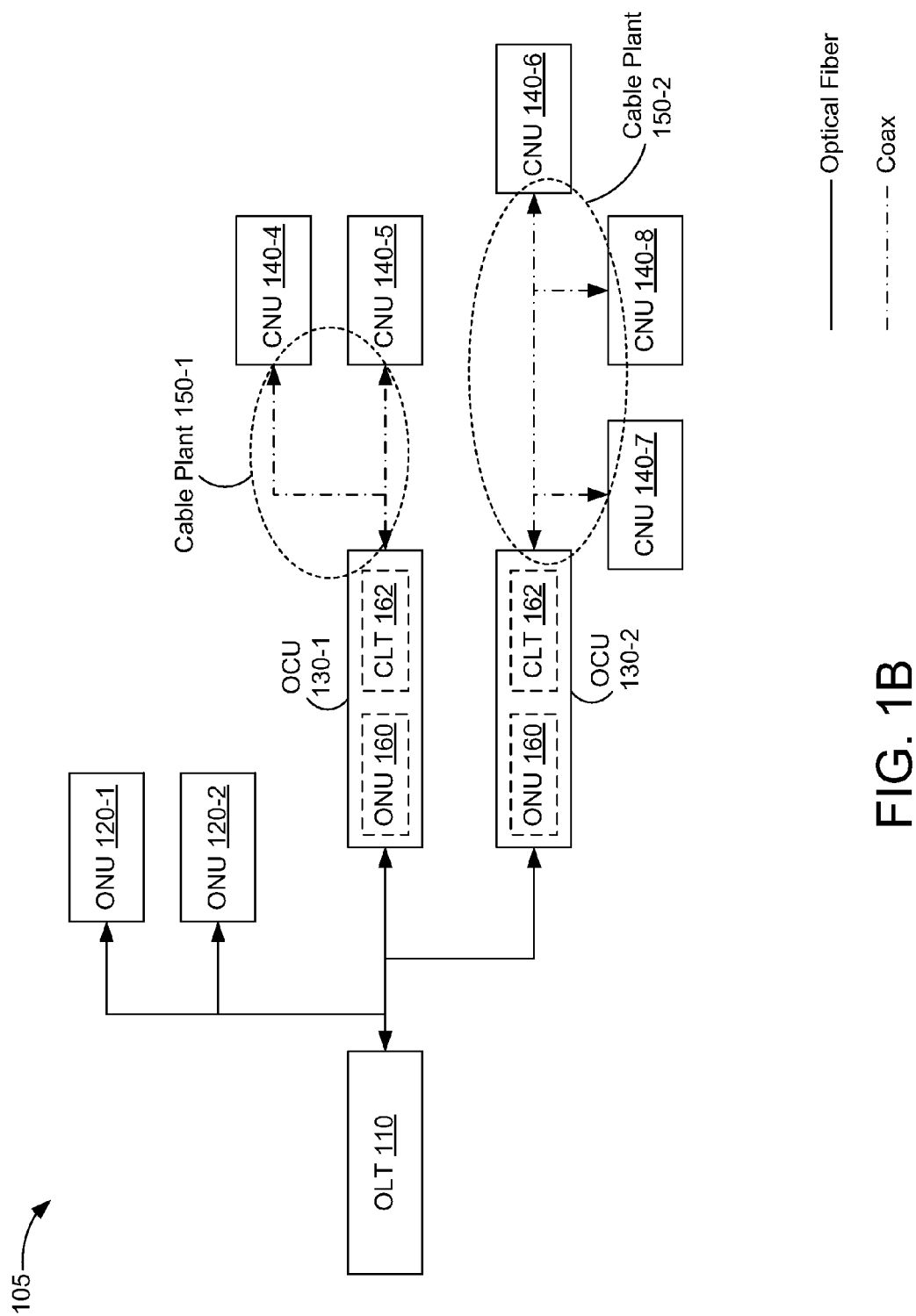
FIG. 1B is a block diagram of a network that includes both optical links and coax links in accordance with some embodiments.

In some embodiments, the CLT 162 is part of an optical-coax unit (OCU) 130-1 or 130-2 that is also coupled to an optical line terminal (OLT) 110, as shown in FIG. 1B. FIG. 1B is a block diagram of a network 105 that includes both optical links and coax links in accordance with some embodiments. The network 105 includes an OLT 110 (also referred to as an optical link terminal) coupled to a plurality of optical network units (ONUs) 120-1 and 120-2 via respective optical fiber links. The OLT 110 also is coupled to a plurality of OCUs 130-1 and 130-2 via respective optical fiber links. OCUs are sometimes also referred to as fiber-coax units (FCUs), media converters, or coax media converters (CMCs).

Each OCU 130-1 and 130-2 includes an ONU 160 coupled with a CLT 162. The ONU 160 receives downstream packet transmissions from the OLT 110 and provides them to the CLT 162, which forwards the packets to the CNUs 140 (e.g., CNUs 140-4 and 140-5, or CNUs 140-6, 140-7, and 140-8) on its cable plant 150 (e.g., cable plant 150-1 or 150-2). In some embodiments, the CLT 162 filters out packets that are not addressed to CNUs 140 on its cable plant 150 and forwards the remaining packets to the CNUs 140 on its cable plant 150. The CLT 162 also receives upstream packet transmissions from CNUs 140 on its cable plant 150 and provides these to the ONU 160, which transmits them to the OLT 110. The ONUs 160 thus receive optical signals from and transmit optical signals to the OLT 110, and the CLTs 162 receive electrical signals from and transmit electrical signals to CNUs 140.

In the example of FIG. 1B, the first OCU 130-1 communicates with CNUs 140-4 and 140-5, and the second OCU 130-2 communicates with CNUs 140-6, 140-7, and 140-8. The coax links coupling the first OCU 130-1 with CNUs 140-4 and 140-5 compose a first cable plant 150-1. The coax links coupling the second OCU 130-2 with CNUs 140-6 through 140-8 compose a second cable plant 150-2. A respective coax link may be a passive coax cable, or alternately may include one or more amplifiers and/or equalizers. In some embodiments, the OLT 110, ONUs 120-1 and 120-2, and optical portions of the OCUs 130-1 and 130-2 (e.g., including the ONUs 160) are implemented in accordance with the Ethernet Passive Optical Network (EPON) protocol.

In some embodiments, the OLT 110 is located at a network operator's headend, the ONUs 120-1 and 120-2 and CNUs 140-4 through 140-8 are located at the premises of respective users, and the OCUs 130-1 and 130-2 are located at the headend of their respective cable plants 150-1 and 150-2 or within their respective cable plants 150-1 and 150-2.

In some embodiments, communications on a respective cable plant 150 are performed using time-division duplexing (TDD): the same frequency band is used for both upstream transmissions from the CNUs 140 to the CLT 162 and downstream transmissions from the CLT 162 to the CNUs 140, and the upstream and downstream transmissions are duplexed in time. For example, alternating time windows are allocated for upstream and downstream transmissions. A time window in which a packet is transmitted from a CNU 140 to a CLT 162 is called an upstream time window or upstream window, while a time window in which a packet is transmitted from a CLT 162 to a CNU 140 is called a downstream time window or downstream window.

Figure 2:
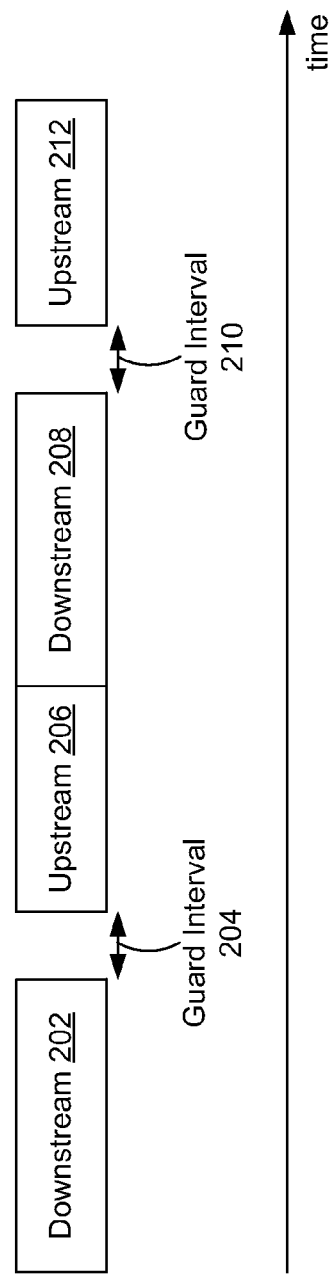
FIG. 2 illustrates timing of time-division duplexed upstream and downstream transmissions as measured at a coax line terminal in accordance with some embodiments.

FIG. 2 illustrates timing of upstream and downstream time windows as measured at a CLT 162 (FIGS. 1A and 1B) in accordance with some embodiments. As shown in FIG. 2, alternating windows are allocated for upstream and downstream transmissions. During a downstream time window 202, the CLT 162 transmits signals downstream to CNUs 140. The downstream time window 202 is followed by a guard interval 204, after which the CLT 162 receives upstream signals from one or more of the CNUs 140 during an upstream time window 206. The guard interval 204 accounts for propagation time on the coaxial links and for switching time in the CLT 162 to switch from a transmit configuration to a receive configuration. The guard interval 204 thus ensures separate upstream and downstream time windows at the CNUs 140. The upstream time window 206 is immediately followed by another downstream time window 208, another guard interval 210, and another upstream time window 212. Alternating downstream and upstream time windows continue in this manner, with successive downstream and upstream time windows being separated by guard intervals and the downstream time windows immediately following the upstream time windows, as shown in FIG. 2. The upstream and downstream transmissions during the time windows 202, 206, 208, and 212 use the same frequency band. The time allocated for upstream time windows (e.g., windows 206 and 212) may be different than the time allocated for downstream time windows (e.g., windows 202 and 208). FIG. 2 illustrates an example in which more time (and thus more bandwidth) is allocated to downstream time windows 202 and 208 than to upstream time windows 206 and 212.

Figure 3:
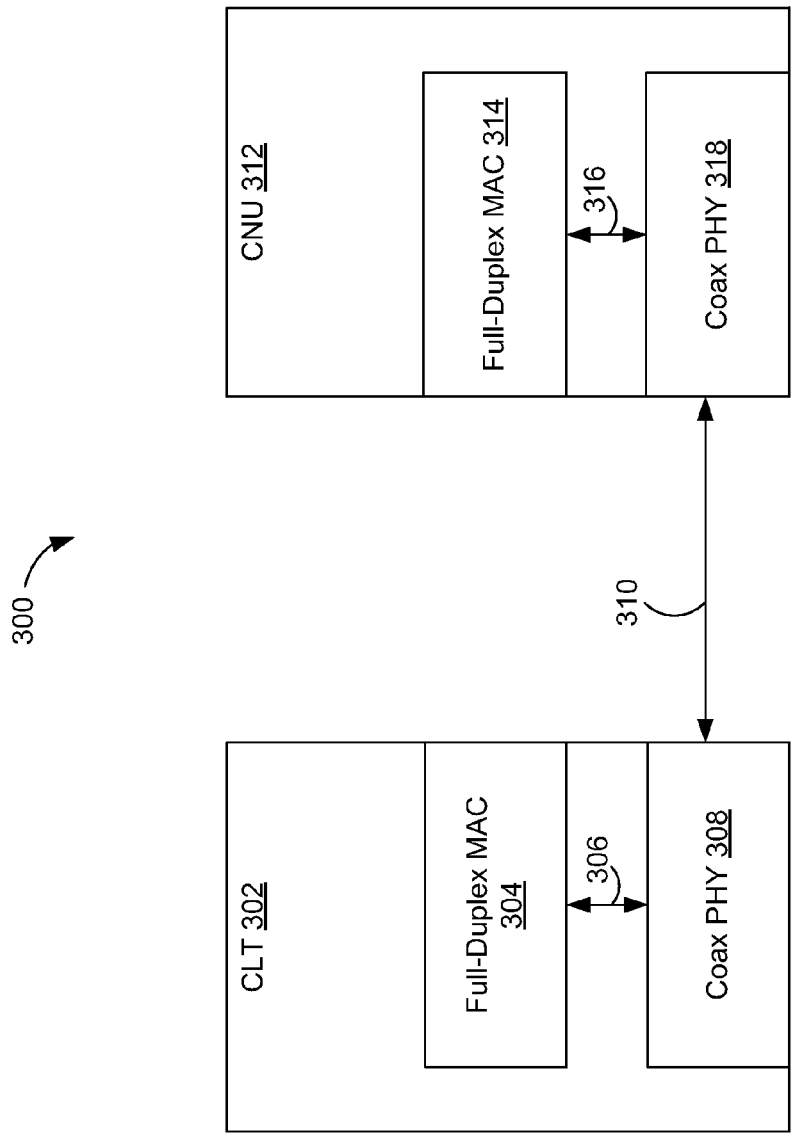
FIG. 3 is a block diagram of a system in which a coax line terminal is coupled to a coax network unit by a coax link in accordance with some embodiments.

FIG. 3 is a block diagram of a system 300 in which a CLT 302 is coupled to a CNU 312 by a coax link 310 in accordance with some embodiments. The CLT 302 is an example of a CLT 162 (FIGS. 1A-1B) and the CNU 312 is an example of one of the CNUs 140-1 through 140-8 (FIGS. 1A-1B). The CLT 302 and CNU 312 communicate via the coax link 310 using TDD. The coax link 310 couples a coax physical layer device (PHY) 308 in the CLT 302 to a coax PHY 318 in the CNU 312. The coax PHY 308 transmits signals to the CNU 312 during downstream time windows (e.g., windows 202 and 208, FIG. 2) and receives signals from the CNU 312 (or from other CNUs on a corresponding cable plant 150 that includes the coax link 310) during upstream time windows (e.g., windows 206 and 212, FIG. 2). Likewise, the coax PHY 318 transmits signals to the CLT 302 during upstream time windows (e.g., windows 206 and 212, FIG. 2) and receives signals from the CLT 302 during downstream time windows (e.g., windows 202 and 208, FIG. 2).

The coax PHY 308 in the CLT 302 is coupled to a full-duplex media access controller (MAC) 304 by a media-independent interface 306. The media-independent interface 306 continuously conveys signals from the MAC 304 to the PHY 308 and also continuously conveys signals from the PHY 308 to the MAC 304. The data rate of the media-independent interface in each direction is higher than the data rate for the coax link 310, allowing the PHY 308 to perform TDD communications despite being coupled to the full-duplex MAC 304 (e.g., as described below with respect to FIGS. 5A-5B, 6A-6B, 7A-7B, 8A-8B, and/or 9A-9B). TDD functionality for the CLT 302 is thus achieved entirely in the coax PHY 308 in accordance with some embodiments.

The coax PHY 318 in the CNU 312 is coupled to a full-duplex MAC 314 by a media-independent interface 316. The media-independent interface 316 continuously conveys signals from the MAC 314 to the PHY 318 and also continuously conveys signals from the PHY 318 to the MAC 314. The TDD functionality of the CNU 312 is achieved entirely in the coax PHY 318 in the same manner as for the coax PHY 308 of the CLT 302.

Figure 4:
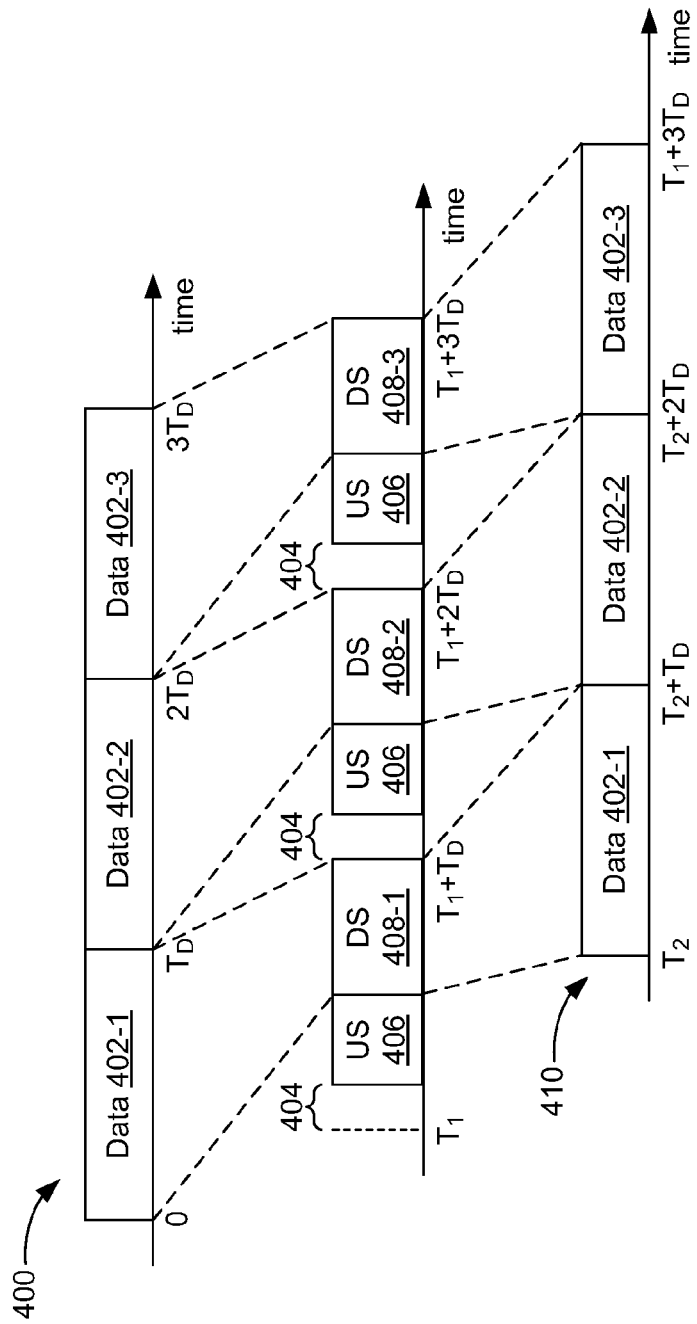
FIG. 4 provides a high-level illustration of data transmission in a system in which a TDD scheme is implemented at the PHY level in accordance with some embodiments.

FIG. 4 provides a high-level illustration of downstream data transmission in the system 300 (FIG. 3) in accordance with some embodiments. The data transmission uses a TDD scheme implemented at the PHY level. A continuous bitstream 400 is provided from the full-duplex MAC 304 to the coax PHY 308. The bitstream 400 includes data 402-1 provided during a TDD period from times 0 to $T_D$, data 402-2 provided during a TDD period from times $T_D$ to $2T_D$, and data 402-3 provided during a TDD period from times $2T_D$ to $3T_D$. A TDD period is the total period of time associated with a guard interval 404, an upstream window 406, and a downstream window 408-1, 408-2, or 408-3 in sequence. The duration of each TDD period equals $T_D$, as shown in FIG. 4. The guard intervals 404 are examples of guard intervals 204 or 210 (FIG. 2). The upstream windows 406 are examples of upstream time windows 206 or 212 (FIG. 2). The downstream windows 408-1, 408-2, and 408-3 are examples of downstream time windows 202 and 208 (FIG. 2).

The PHY 308 (FIG. 3) converts the data 402-1 into a first downstream transmission signal that is transmitted during a first downstream (DS) window 408-1. Likewise, the data 402-2 is converted into a second downstream transmission signal that is transmitted during a second downstream window 408-2, and the data 402-3 is converted into a third downstream transmission signal that is transmitted during a third downstream window 408-3. In this example, $T_1$ represents the processing time for the PHY 308 to perform this conversion. Each downstream window 408-1, 408-2, and 408-3 is included in a respective TDD period that also includes an upstream (US) window 406 and a guard interval 404. The PHY 318 (FIG. 3) in the CNU 312 receives the downstream transmission signals and reconstructs a continuous bitstream 410 that includes the data 402-1, 402-2, and 402-3. Starting at a time $T_2$, the PHY 318 passes the continuous bitstream to the MAC 314 (FIG. 3). In this example, $T_2$ represents the channel delay on the coax link 310 plus processing time in both the PHY 308 and PHY 318.

While FIG. 4 illustrates downstream transmission, a similar scheme may be used for upstream transmission. For example, the MAC 314 in the CNU 312 (FIG. 3) may provide a continuous bitstream to the PHY 318, which converts the data in the bitstream into discrete transmission signals that are transmitted upstream during successive upstream transmission windows 406 (assuming the successive upstream windows 406 are allocated to the CNU 312 and not to other CNUs on the cable plant). The PHY 308 in the CLT 302 (FIG. 3) receives the transmission signals, reconstructs the continuous bitstream, and provides the reconstructed bitstream to the MAC 304.

To convert the continuous bitstream 400 into the discrete signals transmitted during the transmission windows 408-1, 408-2, and 408-3, the PHY 308 performs symbol mapping and maps the symbols to corresponding time slots and physical resources in the transmission windows 408-1, 408-2, and 408-3. A single carrier or multi-carrier transmission scheme may be used.

A more detailed example of TDD operation for downstream transmissions is now provided with reference to FIGS. 5A and 5B. In FIG. 5A, a TDD PHY (e.g., coax PHY 308, FIG. 3) includes a physical coding sublayer (PCS) 508, a physical medium attachment sublayer (PMA) 514, and a physical medium dependent sublayer (PMD) 516. The PCS 508 is coupled to a full-duplex MAC 502 (e.g., MAC 304, FIG. 3) through a media independent interface (xMII) 506 and a reconciliation sublayer (RS) 504. In some embodiments, the media-independent interface 506 is a 10 Gigabit Media-Independent Interface (XGMII) operating at 10 Gbps. (The term media-independent interface may refer to a family of interfaces but also to a particular type of media-independent interface in the family. As used herein, the term refers to the family of interfaces and is abbreviated xMII to distinguish it from specific media-independent interfaces such as XGMII.) The media-independent interface 506 is shown symbolically in FIG. 5A as arrows but in practice includes first interface circuitry coupled to the RS 504, second interface circuitry coupled to the PCS 508 in the PHY, and one or more signal lines connecting the first and second interface circuitry.

In some embodiments, the PHY of FIG. 5A, including the PCS 508, PMA 514, PMD 516, and the PHY's portion of the xMII 506, is implemented in hardware in a single integrated circuit. The full-duplex MAC 502 may be implemented in a separate integrated circuit or the same integrated circuit.

FIG. 5B is aligned with FIG. 5A to show downstream signals provided between the various sublayers of FIG. 5A in accordance with some embodiments. The signals of FIG. 5B thus correspond to the solid downward arrows of FIG. 5A. The MAC 502 transmits a continuous bitstream 520 across the media-independent interface 506 to the PCS 508. The media-independent interface 506 runs at a fixed rate $R_{xMII}$ that is higher than the rates of other interfaces in the system of FIG. 5A. The bitstream 520 includes data packets 522 (in corresponding frames) and idle packets 524; the idle packets 524 are included in the bitstream 520 to maintain the fixed rate $R_{xMII}$.

The PCS 508 includes one or more upper PCS layers 510 that remove the idle packets 524 and perform a forward error correction (FEC) encoding process that inserts parity bits in the data packets (D+P), resulting in a bitstream 530 that includes data packets 532 and idle characters 534 that act as packet separators. The upper PCS layers 510 provide the bitstream 530 to a TDD adapter 512 in the PCS 508 at a downstream baud rate of $R_{PCS,DS}$. The TDD adapter 512 adapts the bitstream 530 to a higher baud rate $R_{PMA}$ and inserts pad bits 546, resulting in a bitstream 540 that is provided to the PMA 514 at $R_{PMA}$. The bitstream 540 includes data packets 542 and idle characters 544 that correspond respectively to the data packets 532 and idle characters 534 of the bitstream 530. The pad bits 546 correspond to time slots 552 during which the PMA 514 and PMD 516 cannot transmit downstream. The time slots 552 correspond, for example, to guard intervals 404 and upstream windows 406 (FIG. 4).

The PMA 514 (or alternatively, the PMD 516) converts the packets 542 into downstream signals 550 that the PMD 516 transmits during downstream windows 408 (e.g., windows 408-1, 408-2, and 408-3, FIG. 4). Each downstream window 408 has a duration $T_{DS}$ and each time slot 552 has a duration $T_{US}+T_{GI}$, where $T_{US}$ is the duration of an upstream window 406 (FIG. 4) and $T_{GI}$ is the duration of a guard interval 404 (FIG. 4).

The baud rates $R_{PCS,Ds}$ and $R_{PMA}$ are related as follows:

$$R_{PCS,DS} = R_{PMA} \times \frac{T_{DS}}{T_{DS} + T_{US} + T_{GI}} \quad (1)$$

Equation (1) shows that $R_{PCS,DS}$ is a fraction of $R_{PMA}$ as determined by the ratio of $T_{DS}$ to an entire TDD cycle. (In FIG. 5B, the indices n and n+1 are used to index successive TDD cycles.)

While FIG. 5B describes downstream transmissions, upstream transmissions may be performed in a similar manner (e.g., in the coax PHY 318 of the CNU 312, FIG. 3).

An example of TDD operation for upstream transmissions is now provided with reference to FIGS. 6A and 6B. The MAC 502 and PHY of FIG. 6A are the same MAC 502 and PHY in FIG. 5A. FIG. 6B is aligned with FIG. 6A to show upstream signals provided between the various sublayers of FIG. 6B in accordance with some embodiments. The signals of FIG. 6B thus correspond to the solid upward arrows of FIG. 6A. The PMD 516 receives analog upstream signals during upstream windows 406 (FIG. 4) and converts them to digital upstream (US) signals 630, which are provided to the PMA 514. No upstream signals 630 are present during time slots 632, each of which includes a downstream window 408 and a guard interval 404 (FIG. 4).

The PMA 514 inserts pad bits 622 during the time slots 632, resulting in a bitstream 620 that also includes data packets (with parity bits) 624 and idle characters 626 that separate the data packets 624. The data packets 624 contain data extracted from the upstream signals 630. The PMA 514 provides the bitstream 620 to the TDD adapter 512 at the baud rate $R_{PMA}$, which is the same $R_{PMA}$ as for downstream communications. The TDD adapter 512 discards the pad bits 622 and adapts the bitstream 620 to a baud rate $R_{PCS,US}$, resulting in the bitstream 610. The bitstream 610 includes data packets 612 and idle characters 614 that correspond respectively to the data packets 624 and idle characters 626 as adapted to $R_{PCS,US}$. $R_{PCS,US}$ is defined as:

$$R_{PCS,US} = R_{PMA} \times \frac{T_{US}}{T_{DS} + T_{US} + T_{GI}} \quad (2)$$

Equation (2) shows that $R_{PCS,US}$ is a fraction of $R_{PMA}$ as determined by the ratio of $T_{US}$ to an entire TDD cycle. In general, $R_{PCS,US}$ is not equal to $R_{PCS,DS}$, although they will be equal if $T_{DS}$ equals $T_{US}$.

The TDD adapter 512 provides the bitstream 610 to the upper PCS layers 510, which discard the parity bits, fill the resulting empty spaces, and adapt the bitstream 610 to $R_{xMII}$ by inserting idle packets 604, resulting in the bitstream 600. The data packets 602 of the bitstream 600 correspond to the data packets 612 with the parity bits removed, as adapted to $R_{xMII}$. In some embodiments, $R_{xMII}$ is the same in the upstream and downstream directions. The upper PCS layers 510 provide the bitstream 600 at $R_{xMII}$ to the full-duplex MAC 502 via the media-independent interface 506 and RS 504. The combination of FIGS. 5B and 6B illustrate the full-duplex nature of the MAC 502: it simultaneously transmits the continuous downstream bitstream 520 (FIG. 5B) and receives the continuous upstream bitstream 600 (FIG. 6B).

While FIG. 6B shows upstream reception, downstream reception may be performed in a similar manner (e.g., in the coax PHY 318 of the CNU 312, FIG. 3).

FIGS. 5A-5B and 6A-6B thus illustrate how to implement TDD in the PCS sublayer 508 by adding a TDD adapter 512 to the PCS sublayer 508. As described, the TDD adapter 512 performs rate adaptation to ensure that the amount of data in the bitstreams 520 and 530 (or 600 and 610) during a TDD cycle equals the amount of data in the bitstream 540 (or 620) during a downstream (or upstream) window. In some embodiments, the other sublayers of the PHY of FIGS. 5A and 6A (e.g., the upper PCS layers 510, PMA 514, and PMD 516) function as defined in the IEEE 802.3 family of standards.

In some embodiments, an adapter for implemented TDD is included in the PMD instead of the PCS.

Figures 7A, 7B:
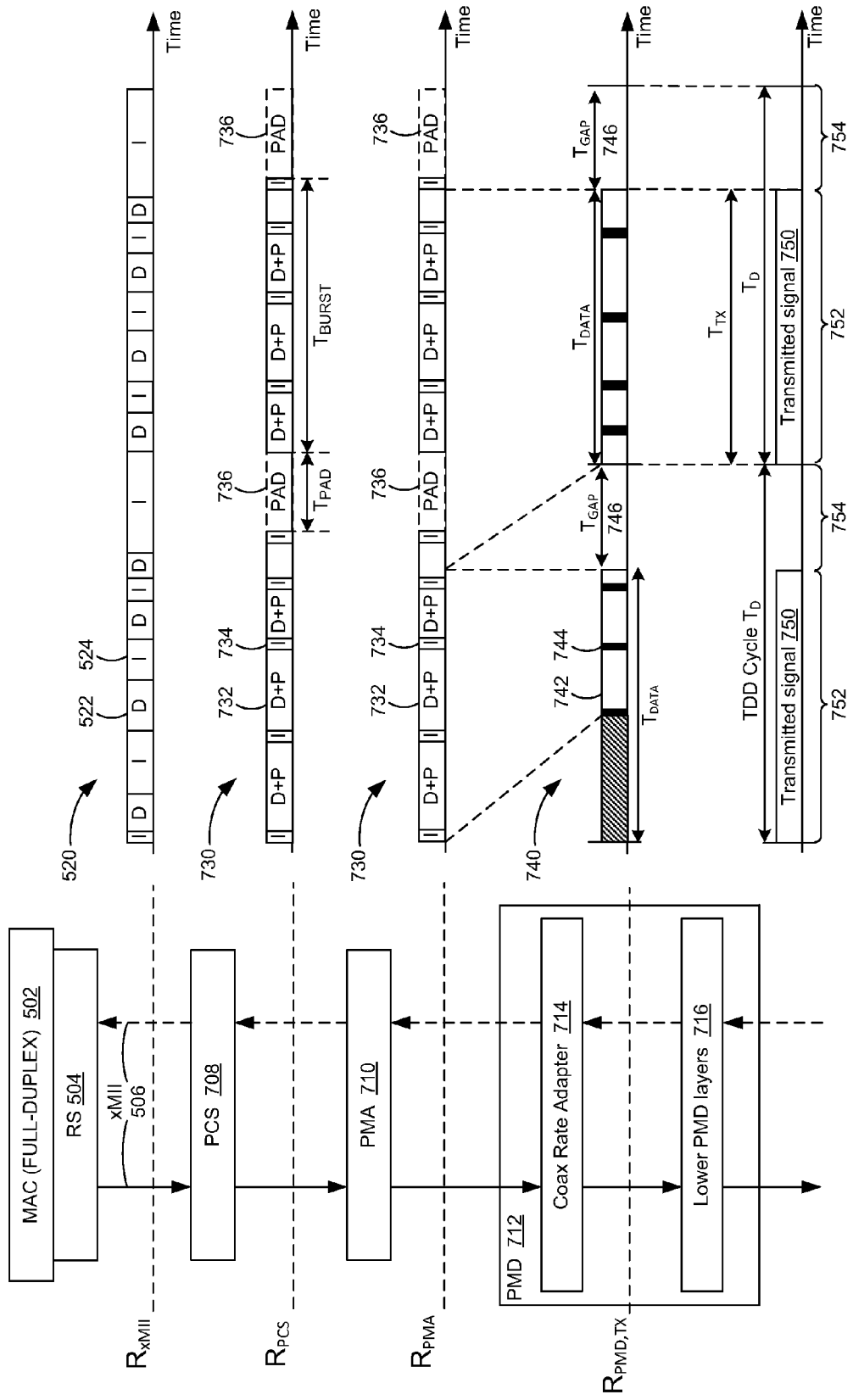
FIG. 7A is a block diagram of sublayers in a TDD PHY coupled to a full-duplex MAC in accordance with some embodiments.
FIG. 7B shows signals provided between the various sublayers of FIG. 7A when transmitting in accordance with some embodiments.

In FIG. 7A, a TDD PHY (e.g., coax PHY 308 or 318, FIG. 3) includes a PCS 708, PMA 710, and PMD 712. The PCS 708 is coupled to the full-duplex MAC 502 (e.g., MAC 304 or 314, FIG. 3) through the xMII 506 and RS 504. In some embodiments, the PHY of FIG. 7A, including the PCS 708, PMA 710, PMD 712, and the PHY's portion of the xMII 506, is implemented in hardware in a single integrated circuit. The full-duplex MAC 502 may be implemented in a separate integrated circuit or the same integrated circuit as the PHY.

FIG. 7B is aligned with FIG. 7A to show signals provided between the various sublayers of FIG. 7A when transmitting in accordance with some embodiments. The signals of FIG. 7B thus correspond to the solid downward arrows of FIG. 7A. The MAC 502 transmits a continuous bitstream 520 across the media-independent interface 506, as described with respect to FIGS. 5A and 5B. The media-independent interface 506 runs at a fixed rate $R_{xMII}$. The PCS 708 receives the continuous bitstream 520, which includes data packets 522 and idle packets 524.

The PCS 708 removes the idle packets 524 and performs an FEC encoding process that inserts parity bits in the data packets 522, resulting in a mixture of data and parity bits (D+P). For example, the PCS 708 generates encoded data frames (D+P) 732 separated by idle characters 734 that fill the inter-frame gaps and act as packet separators. In some embodiments, the PCS 708 deletes some idle characters from the idle packets 524, leaving idle characters to fill the gaps between the data frames 732, and performs stream-based FEC encoding on the data and remaining idle characters of the bitstream 520, producing parity bits that take the place of the deleted idle characters. Alternatively, the PCS 708 performs block-based FEC encoding. The PCS 708 generates a bitstream 730 in which the encoded data frames 732 and idle characters 734 are grouped into bursts. The PCS 708 inserts pad bits 736 into the bitstream 730; the pad bits 736 separate respective bursts. (Alternatively, instead of inserting pad bits 736, the PCS 708 leaves gaps in the bitstream 730, such that the bitstream 730 is not continuous.) In some embodiments, the pad bits 736 (or alternatively, the gaps) have a fixed length (i.e., duration) $T_{PAD}$ and the bursts have a fixed length (i.e., duration) $T_{BURST}$. In other embodiments, the values of $T_{PAD}$ and $T_{BURST}$ vary about fixed averages and the PCS 708, PMA 710, and/or PMD 712 perform buffering to accommodate this variation.

The PCS 708 provides the bitstream 730 to the PMA 710 at a rate $R_{PCS}$ that equals the rate $R_{xMII}$. The PMA 710 processes the bitstream 730 (e.g., in accordance with IEEE 802.3 standards) and forwards the bitstream 730 to the PMD 712 at a rate $R_{PMA}$ that equals the rates $R_{xMII}$ and $R_{PCS}$. The xMII 506, PCS 708, and PMA 710 thus all operate at the same rate (e.g., 10 Gbps).

(The term "bitstream" as used herein includes all signals described as such that are transmitted between respective PHY sublayers as shown in the figures. It therefore is apparent that the term "bitstream" may include streams of samples and/or streams of symbols as well as streams of individual bits.)

The PMD 712 includes a coax rate adapter 714 and one or more lower PMD layers 716. The coax rate adapter 714 receives the bitstream 730 from the PMA 710 at the rate $R_{PMA}$, removes the pad bits 736, adapts the encoded data frames 732 and idle characters 734 to a lower rate $R_{PMD,TX}$, and periodically inserts gaps 746 of duration $T_{GAP}$. The result is a bitstream 740 with data frames 742 and idle character separators 744. The data frames 742 and idle character separators 744 between two gaps 746 have a total length (i.e., duration) of $T_{DATA}$. $T_{DATA}$ matches the length $T_{TX}$ of a transmission window 752 in a TDD Cycle of duration $T_D$. The PHY of FIG. 7A can transmit during each transmission window 752, which may be a downstream window 202 or 208 (FIG. 2) for a CLT 162 (FIGS. 1A-1B) or an upstream window 206 or 212 (FIG. 2) for a CNU 140 (FIGS. 1A-1B). The PHY of FIG. 7A cannot transmit, however, during times 754 that correspond to reception windows (e.g., upstream windows 206 and 212, FIG. 2, for a CLT 162 or downstream windows 202 or 208, FIG. 2, for a CNU 140) and guard intervals (e.g., guard intervals 204 or 210, FIG. 2).

The rates $R_{PMD,TX}$ and $R_{PMA}$ are related as follows:

$$R_{PMD,TX} = R_{PMA} \times \frac{T_{BURST}}{T_{DATA}}. \quad (3)$$

In some embodiments, $T_{BURST}$ may be substantially shorter than $T_{DATA}$. For example, a burst may be a single FEC code word (e.g., in embodiments using stream-based FEC) or a single frame (e.g., a single Ethernet frame). Furthermore, the period $T_{BURST}+T_{PAD}$ may be less than the period $T_{DATA}+T_{GAP}$. Also, the values of $T_{BURST}$, $T_{PAD}$, and $T_{BURST}+T_{PAD}$ may vary (e.g., about fixed averages). FIGS. 8A and 8B illustrate an example in which $T_{BURST}$ is less than $T_{DATA}$, $T_{BURST}+T_{PAD}$ is less than $T_{DATA}+T_{GAP}$, and the values of $T_{BURST}$, $T_{PAD}$, and $T_{BURST}+T_{PAD}$ vary. The bitstream 830 of FIG. 8B is an example of the bitstream 730 of FIG. 7B. In this example, the rates $R_{PMD,TX}$ and $R_{PMA}$ are related as follows:

$$R_{PMD,TX} = R_{PMA} \times \frac{T_{BURST}}{T_{DATA}} \times \frac{T_{DATA}+T_{GAP}}{T_{BURST}+T_{PAD}}. \quad (4)$$

The lower PMD layers 716 convert the data frames 742 into transmit signals 750 that are transmitted onto a coax link (e.g., link 310, FIG. 3) during transmission windows 752. The gaps 746 in the bitstream 740 correspond to times 754 between transmission windows 752 (e.g., to a combination of guard intervals and reception windows). The start of a transmission window 752 may be aligned with the end of a sequence of pad bits 736 or with the start of a burst, but is not necessarily so aligned.

An example of TDD operation for data reception is now provided with reference to FIGS. 9A and 9B. FIG. 9A shows the same MAC and PHY as FIGS. 7A and 8A. FIG. 9B is aligned with FIG. 9A to show signals provided between the various sublayers of FIG. 9A when receiving in accordance with some embodiments. The signals of FIG. 9B thus correspond to the solid upward arrows of FIG. 9A. The lower PMD layers 716 receive signals 902 during receive windows 906 of duration $T_{RX}$ (e.g., downstream windows 202 and 208, FIG. 2, for a CNU 140 or upstream windows 206 and 212, FIG. 2, for a CLT 162) and convert them to a bitstream 910 that includes data frames 912 and idle character separators 914 in time periods of duration $T_{DATA}$ that are separated by gaps of duration $T_{GAP}$. The data frames 912 are encoded and include parity bits. $T_{DATA}$ corresponds to receive windows 906 and equals $T_{RX}$; $T_{GAP}$ corresponds to periods 904 of TDD cycles in which the PHY does not receive (e.g., periods 904 that are a combination of a transmission window 752, FIGS. 7B and 8B, and a guard interval). The bitstream 910 is provided to the coax rate adapter 714 at a rate $R_{PMD,RX}$, which may be calculated using an equation analogous to Equation (3) or (4).

The rate $R_{PMD,RX}$ may differ from $R_{PMD,TX}$ due to asymmetry between upstream and downstream bandwidth. In some embodiments, fewer sub-carriers are available in the upstream direction than in the downstream direction, resulting in less upstream bandwidth than downstream bandwidth. As a result, $R_{PCS,RX}$ is less than $R_{PCS,TX}$ in the CLT 162 and is greater than $R_{PCS,TX}$ in a CNU 140. (The difference between $R_{PCS,RX}$ and $R_{PCS,TX}$ causes the relative values of $T_{BURST}$ and $T_{PAD}$ for transmission to differ from the relative values of $T_{BURST}$ and $T_{PAD}$ for reception.) However, $R_{PMA}$ is constant with the same value in both directions in accordance with some embodiments.

The coax rate adapter 714 inserts pad bits 922 (or alternatively leaves gaps) in the bitstream 910, resulting in a bitstream 920 that is provided to the PMA 710 at a rate $R_{PMA}$. In addition to the pad bits 922, the bitstream 920 includes encoded data frames 924 and idle character separators 926 that correspond to the data frames 912 and separators 914. The PMA 710 processes the bitstream 920 (e.g., in accordance with IEEE 802.3 standards) and forward the bitstream 920 to the PCS 708 at the rate $R_{PCS}$, which equals $R_{PMA}$.

The PCS 708 decodes the data frames 924 and removes the parity bits, resulting in data packets 602. The PCS 708 also removes the pad bits 922 and inserts idle packets 604, resulting in a bitstream 600 (FIG. 6B). The bitstream 600 is transmitted across the xMII 506 to the RS 504 and MAC 502 at the rate $R_{xMII}$, which equals $R_{PCS}$ and $R_{PMA}$. Furthermore, these rates may be the same as the corresponding rates for data transmission as described with respect to FIGS. 7A-7B and 8A-8B.

Figure 10:
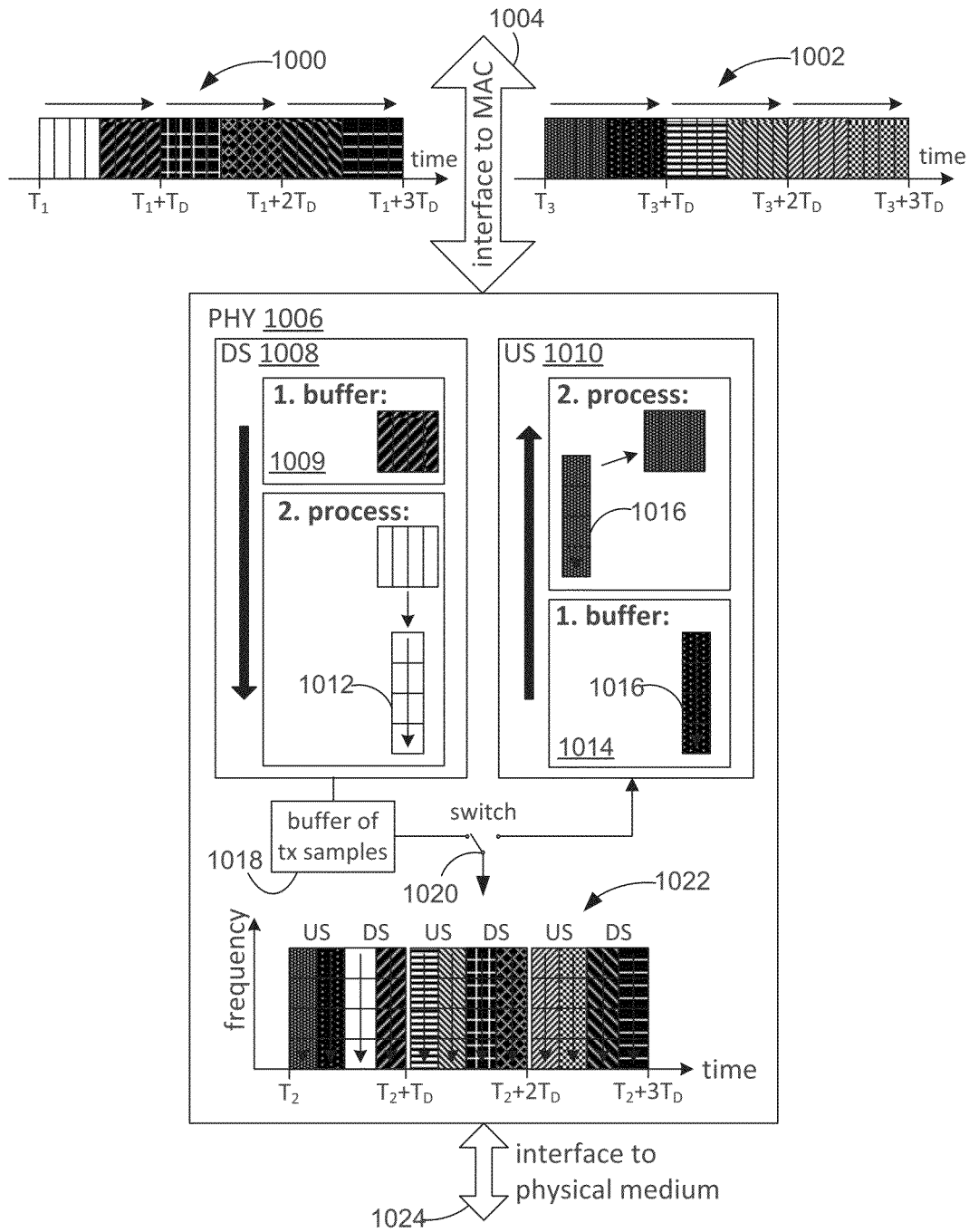
FIG. 10 illustrates the operation of an OFDM PHY that implements TDD in accordance with some embodiments.

In some embodiments, the PHY of FIGS. 5A and 6A and the PHY of FIGS. 7A, 8A, and 9A (e.g., the PHYs 308 and 318, FIG. 3) are orthogonal frequency-division multiplexing (OFDM) PHYs that transmit and receive OFDM symbols using TDD. FIG. 10 illustrates the operation of such an OFDM PHY 1006 in accordance with some embodiments. The PHY 1006 is coupled to a full-duplex MAC (e.g., MAC 502, FIGS. 5A, 6A, 7A, 8A, and 9A; MAC 304 or 314, FIG. 3) by a media-independent interface 1004 (e.g., xMII 506, FIGS. 5A, 6A, 7A, 8A, and/or 9A; interface 306, FIG. 3). In the downstream direction, the MAC provides a continuous bitstream 1000 to the PHY 1006. Downstream processing circuitry 1008 (including, for example, downstream portions of the PCS 508, PMA 514, and PMD 516, FIGS. 5A and 6A, or of the PCS 708, PMA 710, and PMD 712, FIGS. 7A, 8A and 9A) collects data from the bitstream 1000 in a buffer 1009. Once enough data has been collected for processing (e.g., for encoding/OFDM symbol construction), the data are converted to time-domain samples 1012 to be transmitted in OFDM symbols. The samples 1012 are buffered in a buffer 1018 until a switch 1020 is set to couple the buffer 1018 to a physical medium interface 1024, thus beginning a downstream transmission window. In the example of FIG. 10, two downstream OFDM symbols 1022 are transmitted during the downstream (DS) window of each TDD cycle. (In FIG. 10, data in the bitstreams 1000 and 1002 have the same fill patterns as their corresponding OFDM symbols.)

During upstream windows, the switch 1020 is set to couple the interface 1024 to a buffer 1014 in upstream processing circuitry 1010. The upstream processing circuitry 1010 includes, for example, upstream portions of the PCS 508, PMA 514, and PMD 516 (FIGS. 5A and 6A) or of the PCS 708, PMA 710, and PMD 712 (FIGS. 7A, 8A and 9A). The buffer 1014 buffers time-domain samples 1016 in received OFDM symbols. In the example of FIG. 10, two upstream OFDM symbols 1022 are received during the upstream (US) window of each TDD cycle. Once the buffer 1014 collects enough samples 1016 for processing (e.g., FFT processing, demodulation, or decoding), the upstream processing circuitry 1010 converts the samples 1016 into bitstream data, thereby recovering a continuous bitstream 1002 that is provided to the full-duplex MAC via the media-independent interface 1004.

While FIG. 10 shows downstream transmission and upstream reception, downstream reception and upstream transmission may be performed in a similar manner (e.g., in a CNU 312, FIG. 3).

Figure 11:
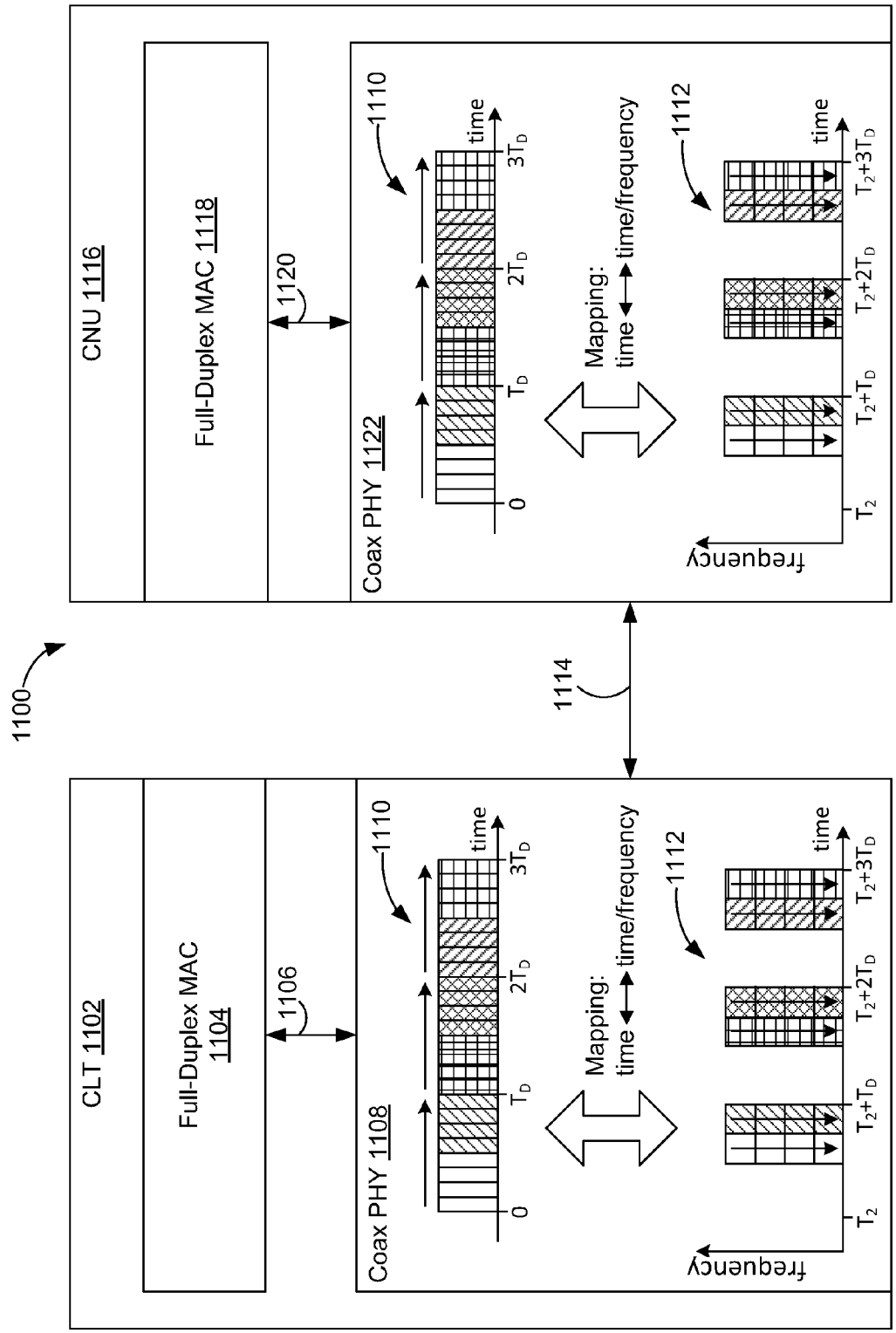
FIG. 11 is a block diagram of a system in which a coax line terminal with a full-duplex MAC and coax TDD PHY is coupled to a coax network unit with a full-duplex MAC and coax TDD PHY in accordance with some embodiments.

FIG. 11 is a block diagram of a system 1100 in which a CLT 1102 with a full-duplex MAC 1104 and coax TDD PHY 1108 is coupled to a CNU 1116 with a full-duplex MAC 1118 and coax TDD PHY 1122 in accordance with some embodiments. The system 1100 is an example of the system 300 (FIG. 3). A coax link 1114 couples the PHYs 1108 and 1122. A media-independent interface 1106 couples the MAC 1104 with the PHY 1108 in the CLT 1102, and a media-independent interface 1120 couples the MAC 1118 with the PHY 1122 in the CNU 1116. In the downstream direction, the PHY 1108 performs mapping to convert data in a continuous bitstream 1110 to OFDM symbols 1112 that are transmitted to the PHY 1122 during downstream windows, and the PHY 1122 performs mapping to recover the data from the received OFDM symbols 1112 and recreate the continuous bitstream 1110. In the upstream direction, the PHY 1122 performs mapping to convert data in a continuous bitstream 1110 to OFDM symbols 1112 that are transmitted to the PHY 1108 during upstream windows, and the PHY 1108 performs mapping to recover the data from the received OFDM symbols 1112 and recreate the continuous bitstream 1110. (While FIG. 11 shows a single bitstream 1110 for simplicity, in practice there are separate upstream and downstream bitstreams that are continuously sent in both respective directions between the MAC 1104 and PHY 1108 in the CLT 1102, and also between the MAC 1118 and PHY 1122 in the CNU 1116.)

Figure 12:
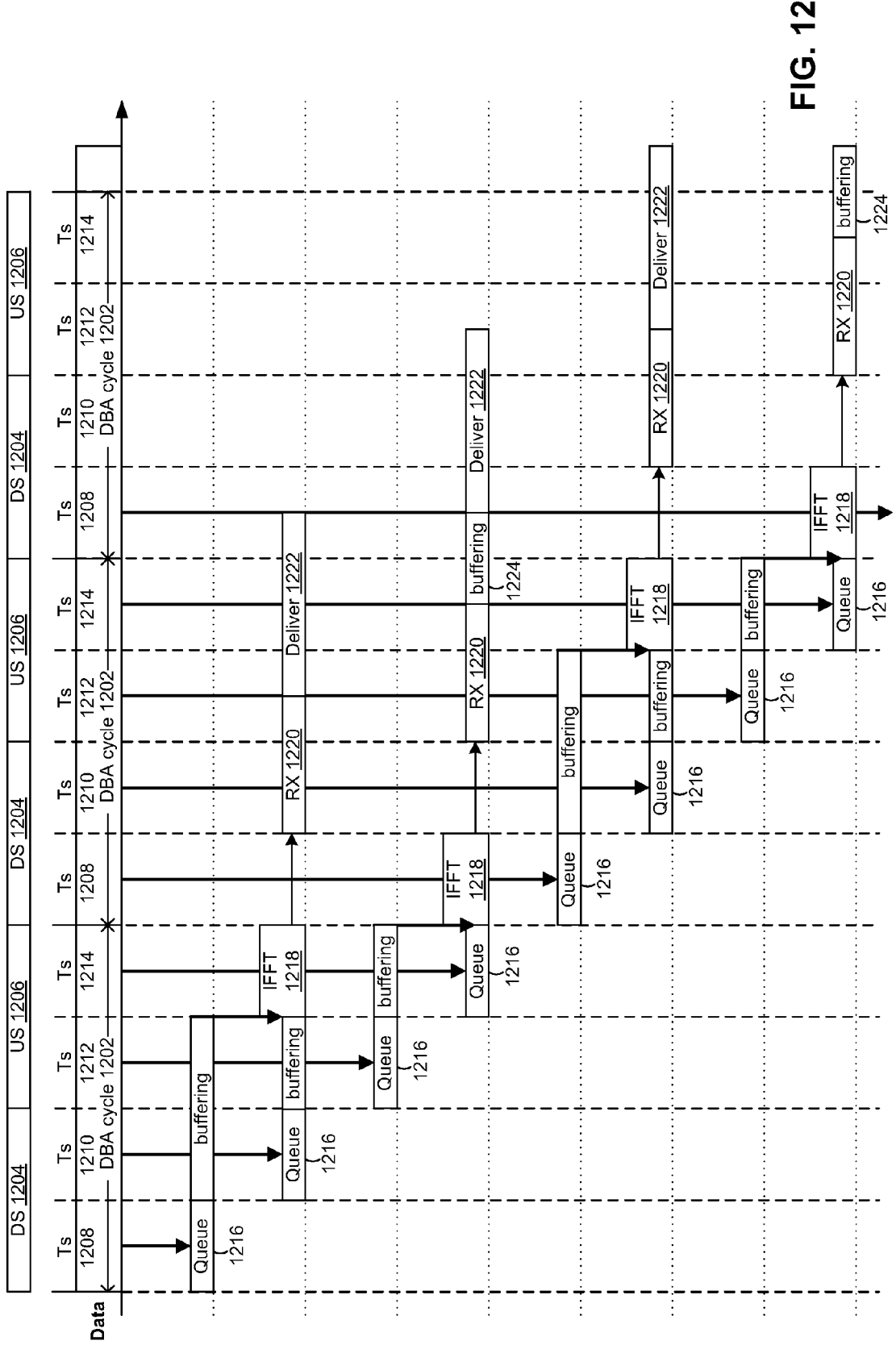
FIG. 12 illustrates downstream transmissions in the system of FIG. 11 in accordance with some embodiments.

FIG. 12 further illustrates downstream transmissions in the system 1100 (FIG. 11) in accordance with some embodiments. The PHY 1108 of the CLT 1102 receives a continuous bitstream of data from the full-duplex MAC 1104 (FIG. 11) during a series of DBA cycles 1202. (DBA stands for dynamic bandwidth allocation; a DBA cycle 1202 is another term for a TDD cycle. Each DBA cycle 1202 includes a downstream window 1204 and an upstream window 1206, as well as a guard interval, which is not shown in FIG. 12 for simplicity.) Each DBA cycle 1202 is divided into four periods 1208, 1210, 1212, and 1214 (or, more generally, a plurality of periods) of duration Ts. In the examples of FIGS. 10-12, two OFDM symbols are transmitted downstream during each DBA cycle 1202. Therefore, the bitstream data for each period 1208, 1210, 1212, and 1214 is data for half an OFDM symbol.

The data for the first and second periods 1208 and 1210 of the first DBA cycle 1202 are provided to a queue 1216 (e.g., buffer 1009, FIG. 10), where they are buffered. Once all the data for the first and second periods 1208 and 1210 have been collected, inverse fast Fourier transform (IFFT) processing 1218 is performed to convert them to samples from which a first OFDM symbol is constructed. (Other processing, such as channel coding performed in the PCS 508, FIGS. 5A and 6A, or the PCS 708, FIGS. 7A, 8A, and 9A, is omitted from FIG. 12 for simplicity.) The first OFDM symbol is then transmitted from the PHY 1108 of the CLT 1102 to the PHY 1122 of the CNU 1116 during a portion of a downstream window 1204 that occurs during the first period 1208 of the second DBA cycle 1202. During receive (RX) processing 1220, the PHY 1122 recovers the bitstream data from the first OFDM symbol and delivers 1222 the recovered bitstream data to the MAC 1118. The duration of this delivery 1222 equals the duration of two periods (i.e., 2*Ts), as shown.

The data for the third and fourth periods 1212 and 1214 of the first DBA cycle 1202 are provided to the queue 1216, where they are buffered. Once all the data for the third and fourth periods 1212 and 1214 have been collected, inverse fast Fourier transform (IFFT) processing 1218 is performed to convert them to samples from which a second OFDM symbol is constructed. (Again, other processing, such as channel coding performed in the PCS 508, FIGS. 5A and 6A, or the PCS 708, FIGS. 7A, 8A, and 9A, is omitted from FIG. 12 for simplicity.) The second OFDM symbol is then transmitted from the PHY 1108 of the CLT 1102 to the PHY 1122 of the CNU 1116 (FIG. 11) during a portion of the downstream window 1204 that occurs during the second period 1210 of the second DBA cycle 1202. During receive (RX) processing 1220, the PHY 1122 (FIG. 11) recovers the bitstream data from the second OFDM symbol. The PHY 1122 then buffers 1224 the recovered bitstream data before delivering 1222 the recovered bitstream data to the MAC 1118 (FIG. 11). This delivery 1222 immediately follows delivery 1222 of the data received in the first OFDM symbol.

Downstream transmission continues in this manner, with the result that a continuous recovered bitstream is delivered from the PHY 1122 to the MAC 1118 of the CNU 1116, even though OFDM symbols are only transmitted downstream during a portion of each DBA cycle 1202.

While FIG. 12 illustrates downstream transmissions, upstream transmissions may be performed in an analogous manner.

Attention is now directed to an OCU implemented as a TDD repeater. Examples of OCUs 130-1 and 130-2 (FIG. 1B)

have been provided above in which the CLT 162 in the OCU 130-1 or 130-2 includes a full-duplex MAC. For example, the CLT 302 (FIG. 3) includes a full-duplex MAC 304 and the CLT 1102 (FIG. 11) includes a full-duplex MAC 1104. In some embodiments, however, an OCU may be implemented as a repeater that lacks a MAC coupled to the OCU's coax PHY. The repeater repeats received signals by converting them from an optical format to a coax format and vice-versa. An OCU implemented as a receiver does not include the ONU 160 and CLT 162 of the OCUs 130-1 and 130-2 of FIG. 1B. Again, OCUs are sometimes also referred to as fiber-coax units (FCUs), media converters, or coax media converters (CMCs).

FIG. 13A is a block diagram of an OCU 1300 implemented as a repeater in accordance with some embodiments. The OCU 1300 includes an optical PHY 1304 that connects to a fiber link 1302 (and thereby to an OLT 110, FIG. 1B) and a coax PHY 1308 that connects to a coax link 1312 (and thereby to a plurality of CNUs 140 on a cable plant 150, FIG. 1B). The optical PHY 1304 is a frequency-division duplexing (FDD) PHY that transmits optical signals on a first frequency or band of frequencies and receives optical signals on a second frequency or band of frequencies distinct from the first frequency or band of frequencies. In some embodiments, the optical PHY 1304 is an EPON PHY. The optical PHY 1304 transmits upstream on the fiber 1302 in a bursty fashion; it does not transmit during idle frame periods.

The coax PHY 1308 is a TDD PHY (e.g., coax PHY 308, FIG. 3, or 1108, FIG. 11). In some embodiments, the coax PHY 1308 includes the PCS 508, including the upper PCS layers 510 and the TDD adapter 512; the PMA 514; and the PMD 516 (FIGS. 5A and 6A). In some embodiments, the coax PHY 1308 includes the PCS 708, the PMA 710, and the PMD 712, including the coax rate adapter 714 and lower PMD layers 716 (FIGS. 7A, 8A, and 9A). In some embodiments, the coax PHY 1308 is an OFDM PHY (e.g., PHY 1006, FIG. 10) that functions as described with respect to FIGS. 10-12, except that instead of providing a continuous bitstream to and receiving a continuous bitstream from a MAC, the coax PHY 1308 provides a continuous bitstream to and receives a continuous bitstream from the optical PHY 1304.

A bit buffer 1306 couples the optical PHY 1304 with the coax PHY 1308. In some embodiments, the optical PHY 1304 provides a first continuous bitstream to the coax PHY 1308 in a format corresponding to a media-independent interface (e.g., in XGMII format), which the coax PHY 1308 processes in a fixed predefined manner. Similarly, the coax PHY 1308 provides a second continuous bitstream to the optical PHY 1304 in the same format. The bit buffer 1306 buffers the first and second continuous bitstreams. The bit buffer 1306 thus is part of a media independent interface 1310 that couples the optical PHY 1304 with the coax PHY 1308. (The media independent interface 1310 also includes interface circuitry in the PHYs 1304 and 1308, which is not shown in FIG. 13A for simplicity.) In some embodiments, the bit buffer 1306 drops packets that are not addressed to any of the CNUs 140 on the cable plant 150 (FIGS. 1A-1B) corresponding to the coax link 1312. For example, such packets are replaced with idle frames. The bit buffer 1306 may optionally include a reconciliation sublayer to perform this filtering in accordance with some embodiments.

FIG. 13B illustrates a bitstream 1320 created by the optical PHY 1304 based on downstream optical signals received via the fiber link 1302. The bitstream 1320 includes first data 1322-1, second data 1322-2, and third data 1322-3. The bitstream 1320 is queued in the bit buffer 1306 and provided to the coax PHY 1308. The coax PHY 1308 creates OFDM symbols based on the bitstream 1320 that are transmitted downstream during downstream windows, as shown in FIG. 13C in accordance with some embodiments. A first pair of OFDM symbols corresponding to the first bitstream data 1322-1 is transmitted during a first downstream window 1330-1, a second pair of OFDM symbols corresponding to the second bitstream data 1322-2 is transmitted during a second downstream window 1330-2, and a third pair of OFDM symbols corresponding to the third bitstream data 1322-3 is transmitted during a third downstream window 1330-3. In this manner, coax TDD communications are made compatible with optical FDD communications in an OCU 1300 designed as a repeater.

Figure 14:
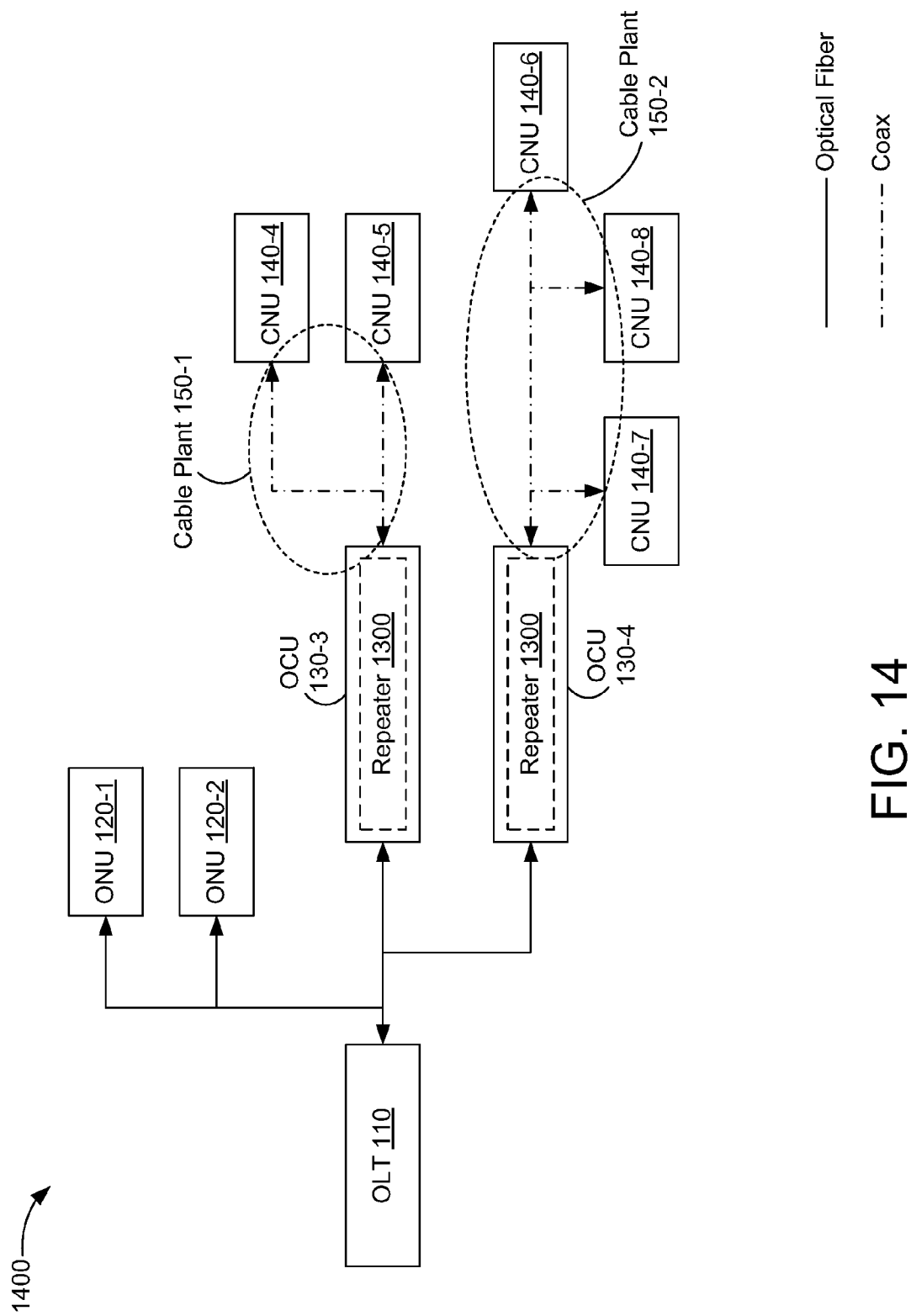
FIG. 14 is a block diagram of a network that includes both optical links and coax links and also includes optical-coax units implemented as the repeater of FIG. 13A in accordance with some embodiments.

FIG. 14 is a block diagram of a network 1400 that is identical to the network 105 of FIG. 1B, except that the OCUs 130-1 and 130-2 of FIG. 1B have been replaced with OCUs 130-3 and 130-4 implemented as repeaters 1300 (FIG. 13A). Because the OCUs 130-3 and 130-4 only perform PHY-layer processing and do not perform MAC or higher-layer processing, the OCUs 130-3 and 130-4 are invisible to the CNUs 140-4 through 140-8 and the OLT 110 from a protocol perspective.

Figure 15:
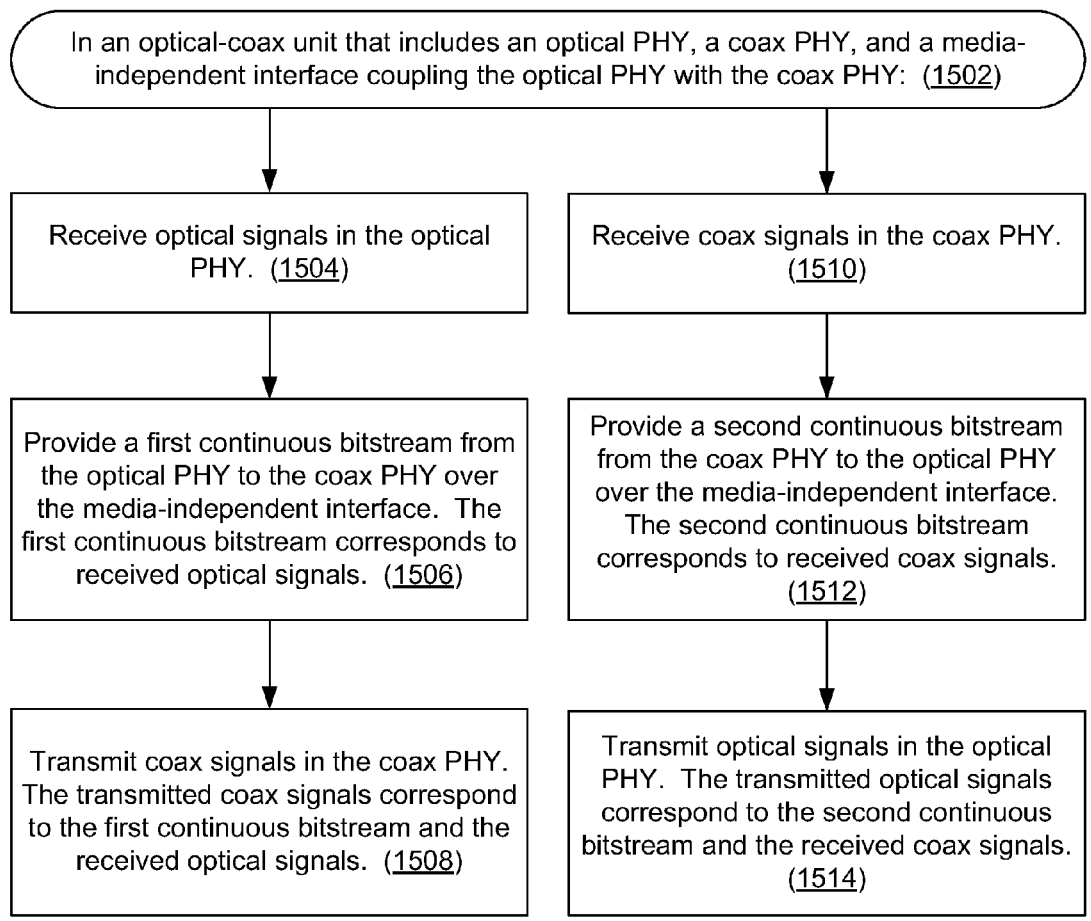
FIG. 15 is a flowchart showing a method of data communications in accordance with some embodiments.

FIG. 15 is a flowchart showing a method 1500 of data communications in accordance with some embodiments. The method 1500 is performed (1502) in an OCU 1300 (FIG. 13A) (e.g., OCU 130-3 or 130-4, FIG. 14) that includes an optical PHY 1304, a coax PHY 1308, and a media-independent interface 1310 coupling the optical PHY 1304 with the coax PHY 1308 (FIG. 13A). In some embodiments, the coax PHY 1308 includes a PCS, PMA, and PMD (e.g., PCS 508, PMA 514, and PMD 516, FIGS. 5A and 6A, or PCS (e.g., PCS 508, PMA 514, and PMD 516, FIGS. 5A and 6A, or PCS 708, PMA 710, and PMD 712, FIGS. 7A, 8A, and 9A).

In the method 1500, optical signals are received (1504) in the optical PHY 1304. A first continuous bitstream (e.g., analogous to bitstream 520, FIG. 5B, 7B, or 8B) is provided (1506) from the optical PHY 1304 to the coax PHY 1308 over the media-independent interface 1310. The first continuous bitstream corresponds to received optical signals. Coax signals are transmitted (1508) in the coax PHY 1308. The transmitted coax signals correspond to the first continuous bitstream and the received optical signals. In some embodiments, the coax PHY 1308 transmits the coax signals in the manner shown for the downstream signals 550 (FIG. 5B) or the transmitted signals 750 (FIG. 7B or 8B).

Also in the method 1500, coax signals are received (1510) in the coax PHY 1308. In some embodiments, the coax PHY 1308 receives the coax signals in the manner shown for the upstream signals 630 (FIG. 6B) or the received signals 902 (FIG. 9B). A second continuous bitstream (e.g., analogous to bitstream 600, FIG. 6B or 9B) is provided (1512) from the coax PHY 1308 to the optical PHY 1304 over the media-independent interface 1310. The second continuous bitstream corresponds to the received coax signals. Optical signals are transmitted (1514) in the optical PHY 1304. The transmitted optical signals correspond to the second continuous bitstream and the received coax signals.

In some embodiments, the optical PHY 1304 receives (1504) and transmits (1514) optical signals by performing FDD, while the coax PHY 1308 receives (1510) and transmits (1508) coax signals by performing TDD. For example, the coax PHY 1308 transmits coax signals during a first plurality of time windows (e.g., including downstream time windows 202 and 208, FIG. 2) and receives coax signals during a second plurality of time windows (e.g., including upstream time windows 206 and 212, FIG. 2) that is distinct from the first plurality of time windows.

In some embodiments, providing (1506) the first continuous bitstream from the optical PHY 1304 to the coax PHY 1308 includes buffering the first continuous bitstream in the bit buffer 1306. Similarly, providing (1512) the second continuous bitstream from the coax PHY 1308 to the optical PHY 1304 may include buffering the second continuous bitstream in the bit buffer 1306.

In some embodiments of the method 1500, the coax PHY 1308 generates a third bitstream based on the first continuous bitstream and corresponding to the transmitted coax signals, adapts a rate of the third bitstream, and inserts pad bits or gaps into the third bitstream. The pad bits or gaps are inserted into the third bitstream in locations corresponding to times during which the coax PHY 1308 does not transmit coax signals. These times include the second plurality of time windows and guard intervals that separate respective time windows of the first and second pluralities of time windows. The PCS may perform these operations. For example, the upper PCS layers 510 (FIG. 5A) generate the bitstream 530 (FIG. 5B) as the third bitstream and the TDD adapter 512 adapts the rate of the bitstream 530 and inserts pad bits 546, resulting in the bitstream 540 (FIG. 5B). Alternatively, the PCS generates the third bitstream; the PMD adapts the rate of the third bitstream and inserts the gaps. For example, the PCS 708 (FIGS. 7A and 8A) generates the bitstream 730 (FIG. 7B) or 830 (FIG. 8B) as the third bitstream. The coax rate adapter 714 of the PMD 712 (FIGS. 7A and 8A) adapts the rate of the bitstream 730 or 830 and inserts gaps 746, resulting in the bitstream 740 (FIGS. 7B and 8B).

In some embodiments of the method 1500, the coax PHY 1308 converts the received coax signals to a fourth bitstream with pad bits in locations corresponding to times during which the coax PHY 1308 does not receive coax signals. These times include the first plurality of time windows and guard intervals that separate respective time windows of the first and second pluralities of time windows. The coax PHY 1308 generates a fifth bitstream based on the fourth bitstream. Generating the fifth bitstream includes adapting a rate of the fourth bitstream and deleting the pad bits from the fourth bitstream. The coax PHY 1308 further generates the second continuous bitstream based on the fifth bitstream. For example, the fourth bitstream (e.g., bitstream 620, FIG. 6B) is generated in the PMA (e.g., PMA 514, FIG. 6A); the fifth bitstream (e.g., bitstream 610, FIG. 6B) and second continuous bitstream (e.g., bitstream 600, FIG. 6B) are generated in the PCS (e.g., PCS 508, FIG. 6B).

In some embodiments of the method 1500, the coax PHY 1308 converts the received coax signals to a fourth bitstream (e.g., bitstream 910, FIG. 9B) with gaps in locations corresponding to times during which the coax PHY 1308 does not receive coax signals. These times include the first plurality of time windows and guard intervals that separate respective time windows of the first and second pluralities of time windows. The coax PHY 1308 further adapts a rate of the fourth bitstream and removes the gaps from the fourth bitstream (e.g., resulting in the bitstream 920, FIG. 9B). These operations are performed, for example, in the PMD (e.g., PMD 712, FIG. 9A).

While the method 1500 includes a number of operations that appear to occur in a specific order, it should be apparent that the method 1500 can include more or fewer operations, which can be executed serially or in parallel. An order of two or more operations may be changed, performance of two or more operations may overlap, and two or more operations may be combined into a single operation. For example, the operations 1504, 1506, 1508, 1510, 1512, and 1514 may be performed simultaneously in an ongoing manner.

In the foregoing specification, the present embodiments have been described with reference to specific exemplary embodiments thereof. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense.

What is claimed is:

1. An optical-coax unit, comprising:
an optical physical-layer device (PHY) to receive and transmit optical signals;
a coax PHY to receive and transmit coax signals; and
a media-independent interface to provide a first continuous bitstream from the optical PHY to the coax PHY and a second continuous bitstream from the coax PHY to the optical PHY,
wherein the first continuous bitstream corresponds to received optical signals and transmitted coax signals, and the second continuous bitstream corresponds to received coax signals and transmitted optical signals, wherein the media-independent interface comprises a bit buffer to buffer the first and second continuous bitstreams, and
wherein the bit buffer comprises a reconciliation sublayer to drop packets in the first continuous bitstream that are not addressed to coax network units coupled to the coax PHY.

2. The optical-coax unit of claim 1, wherein the optical PHY is to receive and transmit the optical signals using frequency-division duplexing; and
the coax PHY is to receive and transmit the coax signals using time-division duplexing.

3. The optical-coax unit of claim 1, wherein the reconciliation sublayer is to replace dropped packets with idle frames.

4. An optical-coax unit, comprising:
an optical physical-layer device (PHY) to receive and transmit optical signals;
a coax PHY to receive and transmit coax signals; and
a media-independent interface to provide a first continuous bitstream from the optical PHY to the coax PHY and a second continuous bitstream from the coax PHY to the optical PHY,
wherein the first continuous bitstream corresponds to received optical signals and transmitted coax signals, and the second continuous bitstream corresponds to received coax signals and transmitted optical signals, and
wherein the coax PHY comprises:
a first sublayer to receive the first continuous bitstream from the media-independent interface and to provide the second continuous bitstream to the media-independent interface; and
a second sublayer to transmit coax signals corresponding to the first continuous bitstream during a first plurality of time windows and to receive coax signals corresponding to the second continuous bitstream during a second plurality of time windows distinct from the first plurality of time windows.

5. The optical-coax unit of claim 4, wherein:
the first sublayer comprises a physical coding sublayer (PCS);
the second sublayer comprises a physical medium-dependent sublayer (PMD); and the coax PHY further comprises a physical medium attachment sublayer (PMA) coupled between the PCS and the PMD.

6. The optical-coax unit of claim 4, wherein the first sublayer comprises:
one or more layers to generate a third bitstream based on the first continuous bitstream and corresponding to the transmitted coax signals; and
a time-division duplexing adapter to adapt a rate of the third bitstream and insert pad bits into the third bitstream in locations corresponding to times during which the second sublayer does not transmit, the times comprising the second plurality of time windows.

7. The optical-coax unit of claim 6, wherein:
time windows of the first plurality of time windows have a first duration;
time windows of the second plurality of time windows have a second duration;
guard intervals of a third duration separate respective time windows of the first and second pluralities of time windows; and
the time-division duplexing adapter is to adapt the rate of the third bitstream by a factor equal to a ratio of the first duration to a sum of the first, second, and third durations.

8. The optical-coax unit of claim 4, wherein the first sublayer comprises:
a time-division duplexing adapter to receive a fourth bitstream that corresponds to the received coax signals and to generate a fifth bitstream by adapting a rate of the fourth bitstream and deleting pad bits from the fourth bitstream, wherein the pad bits are situated in the fourth bitstream in locations corresponding to times during which the second sublayer does not receive, the times comprising the first plurality of time windows; and
one or more layers to generate the second continuous bitstream based on the fifth bitstream.

9. The optical-coax unit of claim 8, wherein:
time windows of the first plurality of time windows have a first duration;
time windows of the second plurality of time windows have a second duration;
guard intervals of a third duration separate respective time windows of the first and second pluralities of time windows; and
the time-division duplexing adapter is to adapt the rate of the fourth bitstream by a factor equal to a ratio of the second duration to a sum of the first, second, and third durations.

10. A method of data communications, comprising:
in an optical-coax unit:
receiving and transmitting optical signals in an optical PHY;
receiving and transmitting coax signals in a coax PHY;
providing a first continuous bitstream from the optical PHY to the coax PHY over a media-independent interface, the first continuous bitstream corresponding to received optical signals and transmitted coax signals; and
providing a second continuous bitstream from the coax PHY to the optical PHY over the media-independent interface, the second continuous bitstream corresponding to received coax signals and transmitted optical signals, wherein:
the media-independent interface comprises a bit buffer;
providing the first continuous bitstream from the optical PHY to the coax PHY over the media-independent interface comprises buffering the first continuous bitstream in the bit buffer; and
providing the second continuous bitstream from the coax PHY to the optical PHY over the media-independent interface comprises buffering the second continuous bitstream in the bit buffer.

11. The method of claim 10, wherein:
receiving and transmitting the optical signals in the optical PHY comprise performing frequency-division duplexing; and
receiving and transmitting the coax signals in the coax PHY comprise performing time-division duplexing.

12. The method of claim 10, further comprising:
dropping packets from the first continuous bitstream that are not addressed to coax network units coupled to the coax PHY; and
replacing the dropped packets with idle frames.

13. A method of data communications, comprising:
in an optical-coax unit:
receiving and transmitting optical signals in an optical PHY;
receiving and transmitting coax signals in a coax PHY;
providing a first continuous bitstream from the optical PHY to the coax PHY over a media-independent interface, the first continuous bitstream corresponding to received optical signals and transmitted coax signals; and
providing a second continuous bitstream from the coax PHY to the optical PHY over the media-independent interface, the second continuous bitstream corresponding to received coax signals and transmitted optical signals, wherein receiving and transmitting coax signals in the coax PHY comprise transmitting coax signals during a first plurality of time windows and receiving coax signals during a second plurality of time windows distinct from the first plurality of time windows, the method further comprising, in the coax PHY:
generating a third bitstream based on the first continuous bitstream and corresponding to the transmitted coax signals;
adapting a rate of the third bitstream; and
inserting pad bits or gaps into the third bitstream in locations corresponding to times during which the coax PHY does not transmit, the times comprising the second plurality of time windows.

14. The method of claim 13, wherein:
the coax PHY comprises a physical coding sublayer (PCS), a physical medium attachment sublayer (PMA), and a physical medium-dependent (PMD) sublayer; and
generating the third bitstream, adapting the rate of the third bitstream, and inserting pad bits into the third bitstream are performed in the PCS.

15. A method of data communications, comprising:
in an optical-coax unit:
receiving and transmitting optical signals in an optical PHY;
receiving and transmitting coax signals in a coax PHY;
providing a first continuous bitstream from the optical PHY to the coax PHY over a media-independent interface, the first continuous bitstream corresponding to received optical signals and transmitted coax signals; and
providing a second continuous bitstream from the coax PHY to the optical PHY over the media-independent interface, the second continuous bitstream corresponding to received coax signals and transmitted optical signals, wherein receiving and transmitting coax signals in the coax PHY comprise transmitting coax signals during a first plurality of time windows and receiving coax signals during a second plurality of time windows distinct from the first plurality of time windows, the method further comprising, in the coax PHY:

converting the received coax signals to a fourth bitstream with pad bits in locations corresponding to times during which the coax PHY does not receive, the times comprising the first plurality of time windows;

generating a fifth bitstream based on the fourth bitstream, wherein generating the fifth bitstream comprises:
  adapting a rate of the fourth bitstream, and
  deleting the pad bits from the fourth bitstream; and
generating the second continuous bitstream based on the fifth bitstream.

16. The method of claim 15, wherein:
the coax PHY comprises a physical coding sublayer (PCS), a physical medium-dependent sublayer (PMA), and a physical medium-dependent (PMD) sublayer;
generating the fourth bitstream is performed in the PMA; and
generating the fifth bitstream and the second continuous bitstream are performed in the PCS.

* * * * *